(12) United States Patent
Deng et al.

(10) Patent No.: US 11,354,860 B1
(45) Date of Patent: Jun. 7, 2022

(54) OBJECT RECONSTRUCTION USING MEDIA DATA

(71) Applicant: QUALCOMM Incorporated, San Diego, CA (US)

(72) Inventors: Yan Deng, La Jolla, CA (US); Michel Adib Sarkis, San Diego, CA (US); Ning Bi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/158,909

(22) Filed: Jan. 26, 2021

(51) Int. Cl.
*G06T 19/20* (2011.01)
*G06T 17/20* (2006.01)
*G06T 13/40* (2011.01)

(52) U.S. Cl.
CPC ............ *G06T 17/205* (2013.01); *G06T 13/40* (2013.01); *G06T 19/20* (2013.01)

(58) Field of Classification Search
None
See application file for complete search history.

(56) References Cited

U.S. PATENT DOCUMENTS

2019/0035149 A1* 1/2019 Chen ..................... G06T 7/50
2021/0158591 A1* 5/2021 Kuribayashi ........... G06T 13/40

* cited by examiner

Primary Examiner — Vu Nguyen
(74) Attorney, Agent, or Firm — Qualcomm Incorporated

(57) ABSTRACT

Systems and techniques are provided for performing video-based activity recognition. For example, a process can include generating a three-dimensional (3D) model of a first portion of an object based on one or more frames depicting the object. The process can also include generating a mask for the one or more frames, the mask including an indication of one or more of regions of the object. The process can further include generating a 3D base model based on the 3D model of the first portion of the object and the mask, the 3D base model representing the first portion of the object and a second portion of the object. The process can include generating, based on the mask and the 3D base model, a 3D model of the second portion of the object.

30 Claims, 18 Drawing Sheets

310

320

330

630

640

650

660

670

680

OBJECT RECONSTRUCTION USING MEDIA DATA

FIELD

The present disclosure generally relates to systems and techniques for constructing three-dimensional (3D) models based on a single video.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame, and can be used to facilitate effective operation of various systems. Examples of such applications and systems include augmented reality (AR), robotics, automotive and aviation, three-dimensional scene understanding, object grasping, object tracking, in addition to many other applications and systems.

BRIEF SUMMARY

In some examples, systems and techniques are described herein for generating one or more models. According to at least one example, a process for generating one or more models includes: generating a three-dimensional (3D) model of a first portion of an object based on one or more frames depicting the object; generating a mask for the one or more frames, the mask including an indication of one or more regions of the object; generating a 3D base model based on the 3D model of the first portion of the object and the mask, the 3D base model representing the first portion of the object and a second portion of the object; and generating, based on the mask and the 3D base model, a 3D model of the second portion of the object.

In another example, an apparatus for generating one or more models is provided that includes a memory (e.g., configured to store data, such as virtual content data, one or more images, etc.) and one or more processors (e.g., implemented in circuitry) coupled to the memory. The one or more processors are configured to and can: generate a three-dimensional (3D) model of a first portion of an object based on one or more frames depicting the object; generate a mask for the one or more frames, the mask including an indication of one or more of regions of the object; generate a 3D base model based on the 3D model of the first portion of the object and the mask, the 3D base model representing the first portion of the object and a second portion of the object; and generate, based on the mask and the 3D base model, a 3D model of the second portion of the object.

In another example, a non-transitory computer-readable medium is provided that has stored thereon instructions that, when executed by one or more processors, cause the one or more processors to: generate a three-dimensional (3D) model of a first portion of an object based on one or more frames depicting the object; generate a mask for the one or more frames, the mask including an indication of one or more of regions of the object; generate a 3D base model based on the 3D model of the first portion of the object and the mask, the 3D base model representing the first portion of the object and a second portion of the object; and generate, based on the mask and the 3D base model, a 3D model of the second portion of the object.

In another example, an apparatus for generating one or more models is provided. The apparatus includes: means for generating a three-dimensional (3D) model of a first portion of an object based on one or more frames depicting the object; means for generating a mask for the one or more frames, the mask including an indication of one or more of regions of the object; means for generating a 3D base model based on the 3D model of the first portion of the object and the mask, the 3D base model representing the first portion of the object and a second portion of the object; and means for generating, based on the mask and the 3D base model, a 3D model of the second portion of the object.

In some aspects, the 3D model of the second portion corresponds to an item that is part of the object. For example, in some aspects, the object is a person, the first portion of the object corresponds to a head of the person, and the second portion of the object corresponds to hair on the head of the person.

In some aspects, the 3D model of the second portion corresponds to an item that is at least one of separable from the object and movable relative to the object. For example, in some aspects, the object is a person, the first portion of the object corresponds to a body region of the person, and the second portion of the object corresponds to an accessory or clothing worn by the person.

In some aspects, the 3D model of the second portion of the object abuts at least a portion of the 3D model of the first portion of the object. In some aspects, the 3D model of the second portion of the object does not visibly collide with the 3D model of the first portion of the object.

In some aspects, the process, apparatuses, and non-transitory computer-readable medium comprise selecting the one or more frames as key frames from a sequence of frames, wherein each key frame depicts the object at different angles.

In some aspects, the process, apparatuses, and non-transitory computer-readable medium comprise: determining that a first key frame does not meet a quality threshold; outputting feedback to facilitate positioning of the object to correspond to the first key frame, capturing at least one frame based on the feedback; and inserting a frame from the at least one frame into the key frames.

In some aspects, the process, apparatuses, and non-transitory computer-readable medium comprise: generating a first bitmap from the 3D model of the first portion of the object for a first angle selected along an axis; generating a first metric at least in part by comparing the first bitmap to a reference frame of the sequence of frames; selecting a first key frame based on a result of the comparison.

In some aspects, comparing the first bitmap to the reference frame comprises performing an intersection over union of the first bitmap and a bitmap of the reference frame.

In some aspects, the process, apparatuses, and non-transitory computer-readable medium comprise: generating a second metric at least in part by comparing the reference frame to a bitmap of a second frame of the sequence of frames; and selecting the second frame as the first key frame based on the second metric.

In some aspects, the process, apparatuses, and non-transitory computer-readable medium comprise: segmenting each frame of the one or more frames into one or more regions; and generating a mask for each frame of the one or more frames, wherein the mask for each frame includes an indication of the one or more regions.

In some aspects, the process, apparatuses, and non-transitory computer-readable medium comprise: projecting each vertex of an initial 3D model to a mask associated with a frame of the one or more frames based on pose information associated with the frame; determining whether each vertex of the 3D model of the first portion is located within a first region of the mask associated with the frame; and extracting the 3D base model based on vertices of the 3D model of the first portion being within the first region of the mask associated with the frame.

In some aspects, the object is a person and the first region corresponds to a facial region of the person and a hair region of the person.

In some aspects, the object is a person and the first region corresponds to a body region of the person and a dress region worn by the person.

In some aspects, the process, apparatuses, and non-transitory computer-readable medium comprise removing one or more vertices from the 3D base model based on a probability that each vertex of the one or more vertices is within a region of the one or more regions of a frame from the one or more frames.

In some aspects, a mask for each frame of the one or more frames comprises a first mask that identifies a first region and a second mask that identifies a second region.

In some aspects, the first region is a face region and the second region is a hair region.

In some aspects, the process, apparatuses, and non-transitory computer-readable medium comprise: initializing a value of each vertex of the 3D base model to an initial value, wherein the initial value indicates that a corresponding vertex is disposed within the first region; projecting a first vertex of the 3D base model into a key frame of the one or more frames; determining whether the vertex of the 3D base model is projected into the first mask or the second mask of the first key frame; and adjusting the value of each vertex based on whether the corresponding vertex is projected into the first mask or the second mask. In some aspects, the value of the first vertex is increased when the first vertex is projected onto the second region, and the value of the first vertex is decreased when the first vertex is projected onto the first region. In some aspects, the process, apparatuses, and non-transitory computer-readable medium comprise: determining a mean probability based on the value of each vertex, wherein a probability that a vertex corresponds to the 3D model of the first portion of the object is based on a comparison of the value of the vertex to the mean probability.

In some aspects, the process, apparatuses, and non-transitory computer-readable medium comprise generating an animation in an application using the 3D model of the first portion and the 3D model of the second portion, wherein the object comprises a person, the 3D model of the first portion corresponds to a head of the person, and the 3D model of the second portion corresponds to hair of the person.

In some aspects, the application includes functions to transmit and receive at least one of audio and text.

In some aspects, the 3D model of the first portion and the 3D model of the second portion depict a user of the application.

In some aspects, the process, apparatuses, and non-transitory computer-readable medium comprise: receiving input corresponding to selection of at least one graphical control for modifying the 3D model of the second portion; and modifying the 3D model of the second portion based on the received input.

In some aspects, the one or more frames are associated with a rotation of the object along a first axis. In some aspects, the one or more frames are associated with a rotation of the object along a second axis. In some aspects, the first axis corresponds to a yaw axis and the second axis corresponds to a pitch axis.

According to at least one other example, a process is provided for generating one or more models. The process includes: generating a three-dimensional (3D) model of a head of a person based on one or more frames depicting the person; generating a mask for the one or more frames, the mask including an indication of one or more of regions of the person; generating a 3D base model based on the 3D model of the first portion of the person and the mask, the 3D base model representing the head of the person and hair of the person; and generating, based on the mask and the 3D base model, a 3D model of the hair of the person.

In another example, an apparatus for generating one or more models is provided that includes a memory (e.g., configured to store data, such as virtual content data, one or more images, etc.) and one or more processors (e.g., implemented in circuitry) coupled to the memory. The one or more processors are configured to and can: generate a three-dimensional (3D) model of a head of a person based on one or more frames depicting the person; generate a mask for the one or more frames, the mask including an indication of one or more of regions of the person; generate a 3D base model based on the 3D model of the first portion of the person and the mask, the 3D base model representing the head of the person and hair of the person; and generate, based on the mask and the 3D base model, a 3D model of the hair of the person.

In another example, a non-transitory computer-readable medium is provided that has stored thereon instructions that, when executed by one or more processors, cause the one or more processors to: generate a three-dimensional (3D) model of a head of a person based on one or more frames depicting the person; generate a mask for the one or more frames, the mask including an indication of one or more of regions of the person; generate a 3D base model based on the 3D model of the first portion of the person and the mask, the 3D base model representing the head of the person and hair of the person; and generate, based on the mask and the 3D base model, a 3D model of the hair of the person.

In another example, an apparatus for generating one or more models is provided. The apparatus includes: means for generating a three-dimensional (3D) model of a head of a person based on one or more frames depicting the person; means for generating a mask for the one or more frames, the mask including an indication of one or more of regions of the person; means for generating a 3D base model based on the 3D model of the first portion of the person and the mask, the 3D base model representing the head of the person and hair of the person; and means for generating, based on the mask and the 3D base model, a 3D model of the hair of the person.

In some aspects, the process, apparatuses, and non-transitory computer-readable medium comprise selecting the one or more frames as key frames from a sequence of frames, wherein each key frame depicts the person at different angles.

In some aspects, the process, apparatuses, and non-transitory computer-readable medium comprise: determining that a first key frame does not meet a quality threshold; outputting feedback to facilitate positioning of the person to correspond to the first key frame; capturing at least one frame based on the feedback; and inserting a frame from the at least one frame into the key frames.

In some aspects, generating the mask for the one or more frames comprises segmenting each frame of the one or more frames into one or more regions; and generating a mask for each frame of the one or more frames, wherein the mask for each frame includes an indication of the one or more regions.

In some aspects, the process, apparatuses, and non-transitory computer-readable medium comprise: projecting each vertex of an initial 3D model to a mask associated with a frame of the one or more frames based on pose information associated with the frame; determining whether each vertex of the 3D model of the head is located within a head region of the mask associated with the frame; and extracting the 3D base model based on vertices of the 3D model of the head being within the head region of the mask associated with the frame.

In some aspects, the process, apparatuses, and non-transitory computer-readable medium comprise removing one or more vertices from the 3D base model based on a probability that each vertex of the one or more vertices is outside of the head region.

In some aspects, the 3D model of the hair of the person does not visibly collide with the 3D model of the head of the person.

In some aspects, generating the 3D model of the hair of the person comprises: initializing a value of each vertex of the 3D base model to an initial value, wherein the initial value indicates that a corresponding vertex is disposed within a hair region; projecting a first vertex of the 3D base model into a key frame of the one or more frames; determining whether the vertex of the 3D base model is projected into a first mask or a second mask of a first key frame, wherein the first mask corresponds to a face region and the second mask corresponds to the hair region; and adjusting the value of each vertex based on whether the corresponding vertex is projected into the first mask or the second mask.

In some aspects, the value of the first vertex is increased when the first vertex is projected onto the second mask (corresponding to the hair region). In some aspects, the value of the first vertex is decreased when the first vertex is projected onto the first mask (corresponding to the face region).

In some aspects, the process, apparatuses, and non-transitory computer-readable medium comprise determining a mean probability based on the value of each vertex, wherein a probability that a vertex corresponds to the 3D model of the hair is based on a comparison of the value of the vertex to the mean probability.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
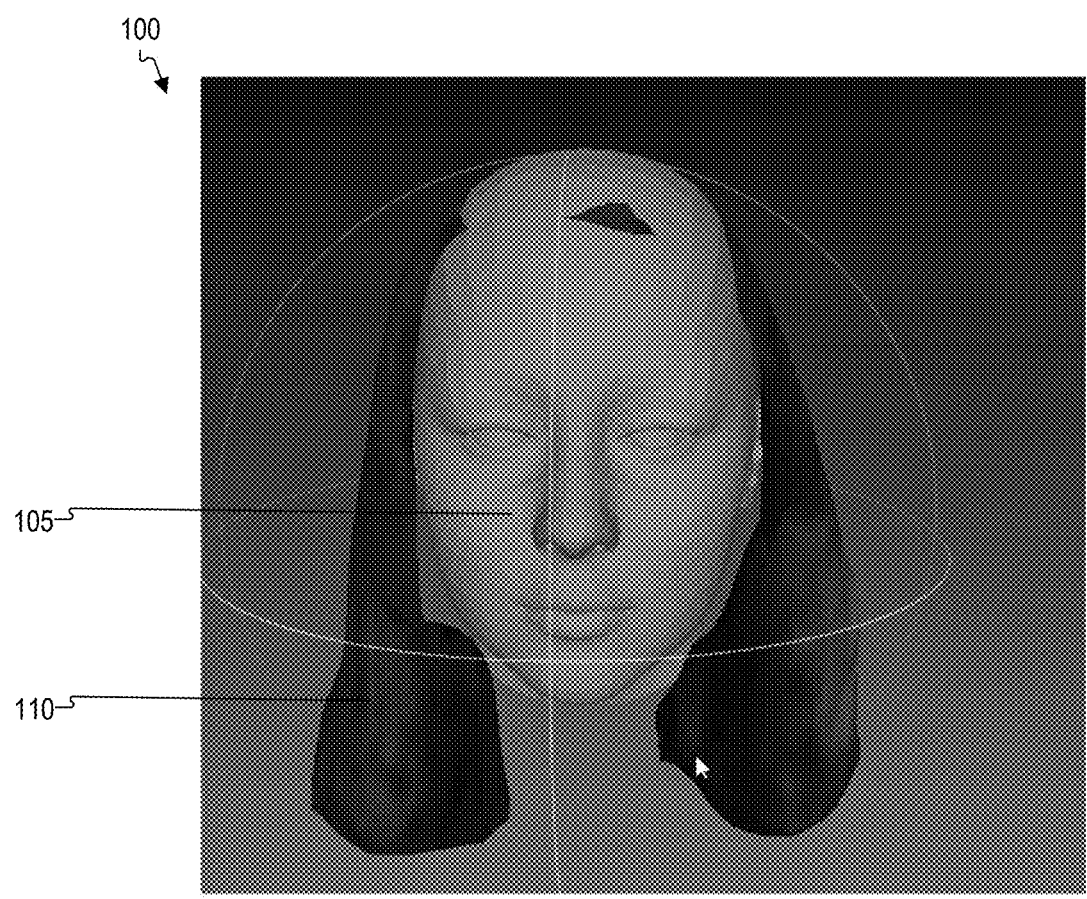
FIG. 1 illustrates an example of a 3D model of a first portion of an object that collides with a 3D model of a second portion of the object.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The generation of three-dimensional (3D) models for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images and to align or register the virtual objects to the images in multiple dimensions. For instance, a real-world object that exists in reality can be represented using a model that resembles or is an exact match of the real-world object. In one example, a model of a virtual airplane representing a real airplane sitting on a runway may be presented in the view of an AR device (e.g., AR glasses, AR head-mounted display (HMD), or other device) while the user continues to view his or her natural surroundings in the AR environment. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number applications that use face data (e.g., for XR systems, for 3D graphics, for security, among others), leading to a large demand for systems with the ability to generate detailed 3D face models (as well as 3D models of other objects) in an efficient and high-quality manner. There also exists a large demand for generating 3D models of other types of objects, such as 3D models of vehicles (e.g., for autonomous driving systems), 3D models of room layouts (e.g., for XR applications, for navigation by devices, robots, etc.), among others.

Generating a detailed 3D model of an object (e.g., a 3D face model) typically requires expensive equipment and multiple cameras in an environment with controlled lighting, which hinders large-scale data collection processes, and may require multiple 3D models to recreate different aspects. A face is an example of an object for which a 3D model can be generated that requires different models for different aspects. For example, hair of a person may need to be modeled separately because movement of the hair is non-rigid and can be independent of the facial movements. In another example, a person's clothes (e.g., a dress, a coat, etc.) may need to be modeled differently because the material and geometric properties of the cloths may change differently than an animate object. Other aspects of animate objects may also be modeled separately because movement of one or more features of the objects may generally be independent of other features (e.g., an elephant's trunk, a dog's tail, a lion's mane). In some examples, an inanimate object (e.g., a tree, a vehicle, a building, an environment or scene, etc.) may need to include a model that depicts generally static aspects (e.g., the trunk and primary branches) and another model that depicts dynamic aspects (e.g., branches and leaves, different parts of a vehicle, different parts of a building, different portions of an environment or scene, etc.).

Performing 3D object reconstruction (e.g., to generate a 3D model of an object, such as a face model and a hair model) from one or more images (e.g., a single video) can be challenging. For example, 3D object reconstruction can be difficult based on the reconstruction involving geometry shape, albedo texture, and illumination estimation. 3D object reconstruction may not reflect other aspects that are associated with the object. In one illustrative example, the shape of a head generally does not change during movement (e.g., rigid movement) of the head. However, the shape of hair associated with the head may change (e.g., non-rigid movement) during movement of the head. Because the hair and the head move differently, the hair of a person may be modeled separately from the head of the person.

There are different types of 3D models for hair, such as a partial derivative equation (PDE) model, a data driven and deformation model, 3D models generated using a deep learning model (e.g., one or more neural networks, such as deep neural networks, generational adversarial networks, convolutional neural networks, etc.), among others. However, issues can arise with the use of such types of 3D models.

For example, the PDE model estimates a depth (e.g., a volume) of the 3D hair model using at least one frame. A frame including a bust of a person (e.g., a head region and a hair region of the person) is used as an initial condition and the depths of the hair are estimated based on the bust model. A face parsing algorithm may be implemented to segment the different regions into depths, which correspond to a volume. The depths are separated into different segments (e.g., regions) and smoothness of the depths between different segments must be enforced in the PDE model. When a single frame is used to create the PDE model, the hair region and the face region can either be over segmented or under segmented, which causes the boundary between the hair region and the face region to be inaccurate. In the event that the PDE model is determined based on multiple frames, the lighting conditions and fast motion can significantly affect and limit the visual fidelity of the PDE model. In particular, a correspondence (e.g., a reference) between frames is required to be established between frames based on the photometric information (e.g., RGB). However, the photometric consistency amongst multiple frames depends on ideal lighting conditions, which cannot be guaranteed. Further, when the subject is moving, the hair will move non-rigidly and identifying a correspondence between non-rigid content in different frames is challenging.

In the driven and deformation model, an artist creates different 3D representation of various hair styles, and a person (e.g., a user of an application) selects a suitable 3D hair style for the head in the application. In this type of hair model, the quality of the 3D hair model is primarily based on a similarity between a source shape (e.g., the created 3D hair style) and a target shape (e.g., the hair of a person in a frame). For example, if a person is building a 3D model of based on a head of that person from a two dimensional (2D) reference frame, the person must search for a 3D hair style model similar to the hair style in the 2D reference frame. Searching for a hair style can be challenging because every style of hair cannot be represented and identifying an ideal hair style based on descriptions and categorization is difficult. Further, any identified 3D hair style will not precisely match the hair style in the 2D reference frame. The person can deform the 3D hair style in the application to match the 3D frame, but deformation can create unexpected fitting issues. As a result, the quality of the 3D hair model is acceptable when there is a high correlation between the 3D hair style and the hair style in the 2D reference frame.

The deep learning-based method extracts 2D orientation of hair from frames and a confidence of an orientation from the frames. A bust model is then fitted to the frame(s) to create a fitted depth map. The orientation, confidence, and depth map are used as input to a machine learning network to create a 3D hair model, which usually has an output for an occupancy field and an orientation field. The occupancy field decides whether the voxel of 3D space belongs to hair and the orientation field determines whether decides the 3D orientation (e.g., direction) of the current voxel if it belongs to hair. The 3D hair model is constructed by combining the occupancy field and orientation field. The occupancy field decides where to grow hair and the orientation field decides the growing direction (e.g., a grouping of hair voxels). However, the deep learning 3D hair model will not be accurate because the deep learning process is not based on real hair data set. Further, there is no process to detect collision between the deep learning 3D hair model and the 3D head model, which can create undesirable visual artifacts (e.g., collisions such as skull overlapping the hair).

Moreover, in current techniques to model different portions of objects, such as a model of a head of a person and a different model for the hair of the person, the resulting 3D models (e.g., the head model and hair model) are generated separately and are not aligned in a 3D coordinate system. In conventional approaches, a user interface can be implemented for positioning and orienting the 3D head model and the 3D hair model to create a full 3D head model. The 3D hair model controls or affects the cranium region of the 3D model of the head. In some instances, the cranium region of the 3D head model can be different than the head of the person. When the 3D head model and 3D hair model are rasterized into a 2D frame for display (e.g., converted from a 3D vector and texture representation to into a 2D bitmap of pixels), the 3D head model and the 3D hair model may collide. A collision in 3D geometries occurs when two solid objects occupy the same space, which is physically impossible in the real world. As a result, collisions in the 3D space creates visual artifacts that are undesirable.

FIG. 1 illustrates a 3D model 100 including a head model 105 and a hair model 110 that collide in a 3D coordinate system. In an illustrative example, the hair model 110 and the head model 105 are positioned using existing techniques. Therefore, the fitting (e.g., positioning and alignment) of the hair model 110 to the head model 105 cannot control how the shape of the cranium region of the head model 105 affects the hair model 110. In this case, when the head model 105 and hair model 110 are converted from a 3D coordinate system into a 2D frame (e.g., rasterization, rendering, etc.), the head model 105 visually appears to overlap and be outside of the hair model 110.

To address this issue, a designer of an application (e.g., an application that displays an avatar of the person) can create functionality to align the 3D hair model with the 3D head model. Further, the avatar may move in the application and cause the 3D hair model to collide with the avatar to create undesirable visual artifacts. In this case, the designer will also need to create a collision detection process to detect collision of 3D models. The designer would also need to apply a collision resolution process to determine how to display the 3D models without creating undesirable visual artifacts.

Systems, apparatuses, processes (or methods), and computer-readable media (collectively referred to as "systems and techniques") are described herein for generating a 3D model of a particular portion of an object from a video (e.g., an RGB video comprising a sequence of frames), or from multiple images. In some examples, as described in more detail below, the systems and techniques can generate a 3D model of a first portion of an object (e.g., a 3D model of a head of a person) based on one or more frames depicting the object. The systems and techniques can generate a mask for the one or more frames. In some examples, the mask can include an indication of one or more of regions of the object. The systems and techniques can also generate a 3D base model based on the 3D model of the first portion of the object and the mask. In some cases, the 3D base model depicts the first portion of the object and a second portion of the object. The systems and techniques can generate, based on the mask and the 3D base model, a 3D model of the second portion of the object (e.g., a 3D model of hair of the person).

The systems and techniques can also automatically align the 3D model of the first portion and the 3D model of the second portion. In some examples, because the 3D model of the second portion of the object is created based on removing content associated with the first portion of the object, the 3D model of the second portion abuts (e.g., is aligned with) at least a portion of the 3D model of the first portion. In one illustrative example, the systems and techniques can be applied to generate a 3D model of a face of a person and a 3D model of hair of the person. Because the 3D model of the hair is created independently of the 3D model of the head, the 3D model of the hair can be applied to different hair styles (e.g., to recreate different hair styles). In addition, because the 3D model of the hair can be extracted with less requirements or constraints than conventional processes, many different styles of hair can be modeled. In some examples, the different hair styles can be used in deep learning processes to improve, for example, a generative adversarial network (GAN) for creating content related to hair using machine learning techniques.

Among other benefits, the systems and techniques described herein can solve the issues that currently exist with 3D model reconstruction techniques (e.g., the deficiency associated with the basis terms, complexity, etc.). For example, the systems and techniques can use a single video to create a 3D model of a first portion of an object. The systems and techniques can also implement a novel algorithm to select frames from the single video and create a 3D base model with the guidance of object parsing masks (e.g., indicating regions of the bitmap that correspond to features of the object), such as a facial parsing mask, and remove portions of the 3D base model to create the 3D model for the second portion. With the guidance of the object parsing masks, unexpected content in the 3D model of the second portion can be identified and removed.

A head and hair will be used herein as illustrative examples of portions of an object for illustrative purposes. However, one of ordinary skill will appreciate that the systems and techniques described herein can be performed for any type of object and any portions of such objects captured in one or more frames. In one illustrative example, similar systems and techniques can be applied to generate a first model of a body of a person, and to generate a second model an item (e.g., a coat, hat, etc.) worn by the person. In another illustrative example, similar systems and techniques can be applied to generate a first model of a first portion of a vehicle or scene observed by one or more sensors of the vehicle, and to generate a second model of a second portion of the vehicle or scene observed by the one or more sensors of the vehicle. In some examples, the systems and techniques can be applied to deformation of non-rigid objects such as clothing, accessories, fabrics, and so forth.

Figure 2:
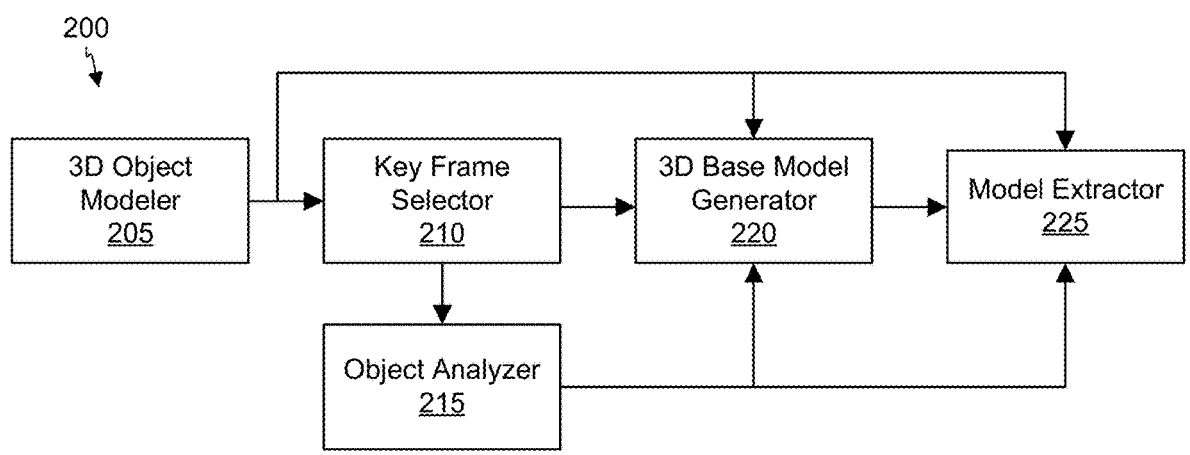
FIG. 2 is a diagram illustrating an example of a system that can perform detailed three-dimensional (3D) face reconstruction from a single Red-Green-Blue (RGB) image, in accordance with some examples.

FIG. 2 is a diagram illustrating an example of a system 200 that can generate one or more models using at least one frame (e.g., a sequence of frames). As shown in FIG. 2, the proposed system 200 includes a 3D object modeler 205, a key frame selector 210, an object analyzer 215, a 3D base model generator 220, and a model extractor 225.

The 3D object modeler 205 can obtain at least one frame (not shown). In some cases, the at least one frame can include a sequence of frames. The sequence of frames can be a video, a group of consecutively captured images, or other sequence of frames. In one illustrative example, each frame of the sequence of frames can include red (R), green (G), and blue (B) components per pixel (referred to as an RGB video including RGB frames). Other examples of frames include frames having luma, chroma-blue, chroma-red (YUV, YCbCr, or Y'CbCr) components per pixel and/or any other suitable type of image. The sequence of frames can be captured by one or more cameras of the system 200 or of another system, obtained from storage, received from another device (e.g., a camera or device including a camera), or obtained from another source.

Figure 3:
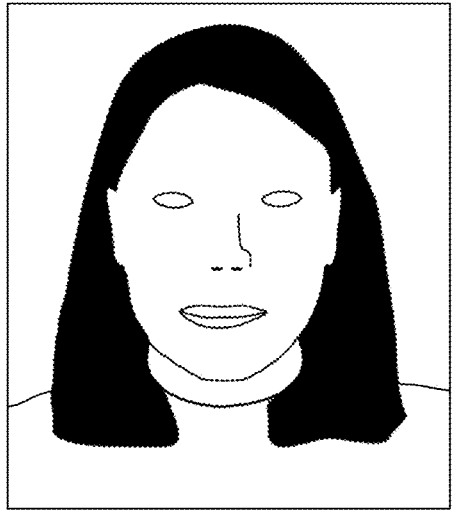
FIG. 3 illustrates three example key frames that are selected from a sequence of frames by a key frame selector, in accordance with some examples.
Figure 3:
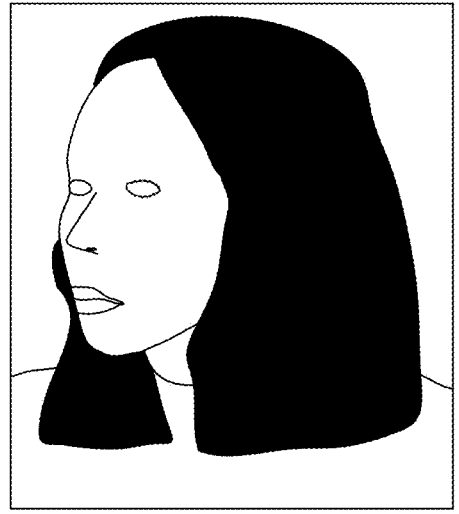
Figure 3:
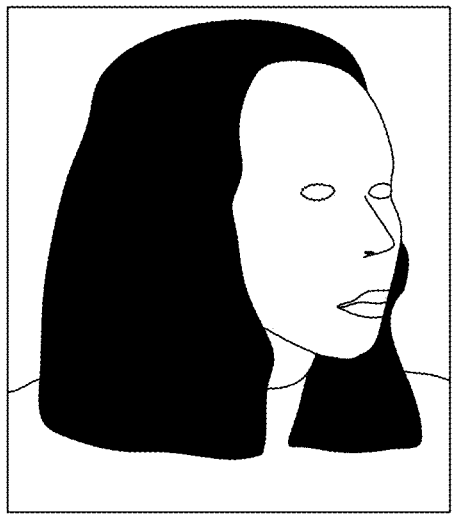

In some examples, the sequence of frames depicts movement of the object to be converted into one or more 3D models by the system 200. In one illustrative example, the sequence of frames begins with a frontal view of a person having a neutral head position with no rotation of the head (e.g., 0°) with respect to the cervical region. FIG. 3 illustrates an example of a frame 310 having a frontal view of a person with a neutral head position. The sequence of frames may then illustrate the person rotating their head to their right side on a first axis (e.g., a yaw axis) to an angle of +60° to show a perspective view of a left side face of their face. FIG. 3 also illustrates a frame 320 of the person with their head rotated head +60° toward their right side. The person may then rotate their head to the left side on the first axis to an angle of −60° to show a perspective view of a right side of their face. For example, FIG. 3 further illustrates a frame 330 having a perspective view of a head of a person rotated −60°. In some examples, the sequence of frames can illustrate the person also rotating their head on a second axis (e.g., a pitch axis).

The 3D object modeler 205 can process one or more frames from the sequence of frames to generate a 3D model of a first portion of the object. In one illustrative example, the 3D model of the first portion of the object may be the head of the person. In some examples, the 3D object modeler 205 can generate a 3D morphable model (3DMM) of the head of the person for each frame in the sequence of frames. A 3DMM model generated using a 3DMM fitting is a statistical model of representing 3D geometry and texture of an object. For instance, a 3DMM can be represented by a linear combination of basis terms with coefficients for shape $X_{shape}$, expression $X_{expression}$, and texture $X_{albedo}$, for example as follows:

$$\text{Vertices}_{3D\_coordinate} = X_{shape}\text{Basis}_{shape} + X_{expression}\text{Basis}_{expression} \quad (1)$$

$$\text{Vertices}_{color} = \text{Color}_{mean\_albedo} + X_{albedo}\text{Basis}_{albedo} \quad (2)$$

Equation (1) is used to determine the position of each vertex of the 3DMM model, and Equation (2) is used to determine the color for each vertex of the 3DMM model.

Figure 4A:
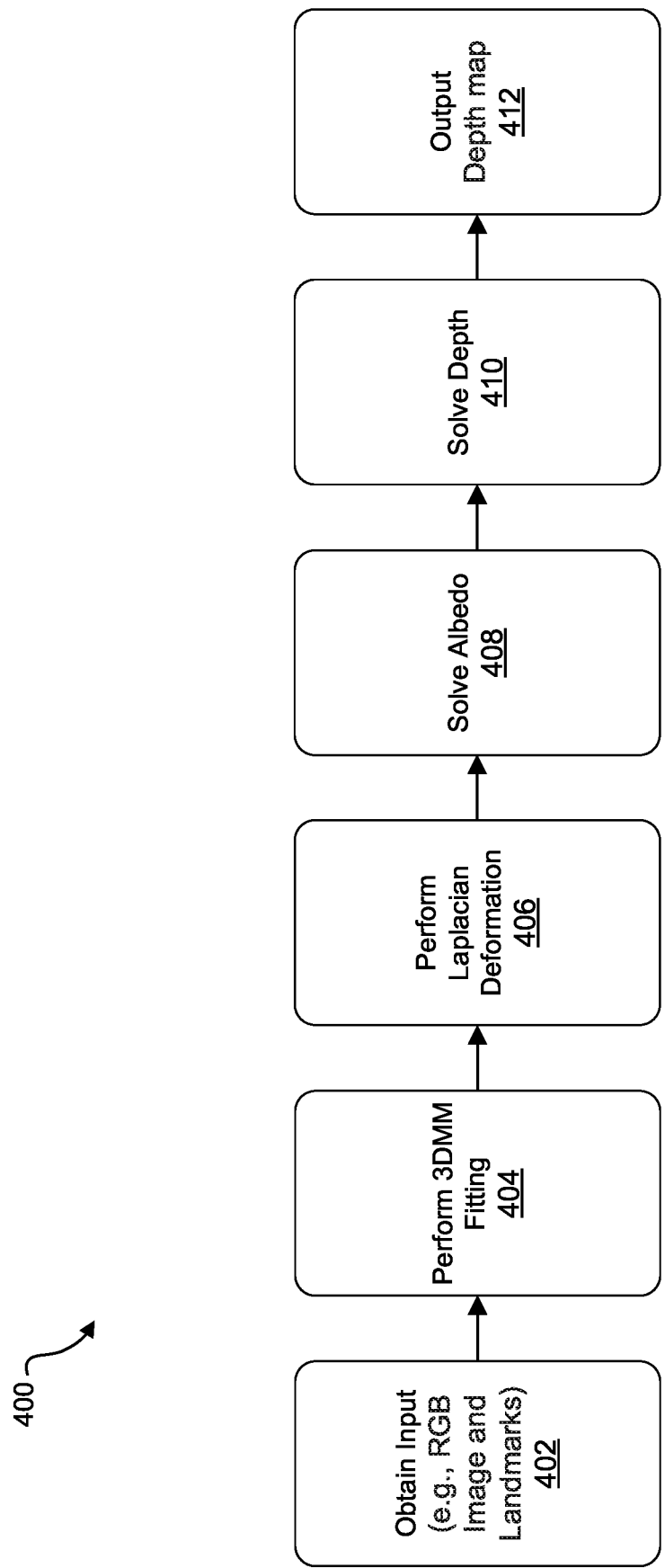
FIG. 4A is a diagram illustrating an example of a process for performing object reconstruction based on a three-dimensional morphable model (3DMM) technique, in accordance with some examples.

FIG. 4 is a diagram illustrating an example of a process 400 for performing object reconstruction based on the 3DMM technique. At operation 402, the process 400 includes obtaining an input, including an image (e.g., an RGB image) and landmarks (e.g., facial landmarks or other landmarks uniquely identifying an object). At operation 404, the process 400 performs the 3DMM fitting technique to generate a 3DMM model. The 3DMM fitting includes solving for the shape (e.g., $X_{shape}$), expression (e.g., $X_{expression}$), and albedo (e.g., $X_{albedo}$) coefficients of the 3DMM model of the object (e.g., the face). The fitting can also include solving for the camera matrix and spherical harmonic lighting coefficients.

At operation 406, the process 400 includes performing a Laplacian deformation to the 3DMM model. For example, the Laplacian deformation can be applied on the vertices of the 3DMM model to improve landmark fitting. In some cases, another type of deformation can be performed to improve the landmark fitting. At operation 408, the process 400 includes solving for albedo. For example, the process 400 can fine-tune albedo coefficients to split out colors not belonging to a spherical harmonic lighting model. At operation 410, the process 400 solves for depth. For example, the process 400 can determine per-pixel depth displacements based on a shape-from-shading formulation or other similar function. The shape-from-shading formulation defines a color for each point of the 3DMM model as a multiplication of the albedo color multiplied by a light coefficient. For instance, the color seen in an image is formulated as the albedo color multiplied by the light coefficient. The light coefficient for a given point is based on the surface normal of the point. At operation 412, the process 400 includes outputting a depth map and/or a 3D model (e.g., outputting the 3DMM).

In some cases, a 3DMM model can be used to describe an object space (e.g., 3D face space) with principal component analysis (PCA). Below is an example Equation (3) that can be used to describe a shape of a 3D object (e.g., a 3D head shape):

$$S=\overline{S}+A_{id}\alpha_{id}+A_{exp}\alpha_{exp}, \quad (3)$$

Using a head as an example of a 3D object, S is the 3D head shape, S is the mean face shape, $A_{id}$ is the eigenvectors (or principal components) trained on 3D face scans with neutral expression, $\alpha_{id}$ is a shape coefficient, $A_{exp}$ is the eigenvectors trained on the offsets between expression and neutral scans, and $\alpha_{exp}$ is the expression coefficient. The 3DMM head shape can be projected onto an image plane using a projection technique, such as using a weak perspective projection. Example Equations (4) and (5) below can be used to calculate an aligned face shape:

$$I=mPR(\alpha,\beta,\gamma)S+t \quad (4)$$

$$I=mPR(\alpha,\beta,\gamma)(\overline{S}+A_{id}\alpha_{id}+A_{exp}\alpha_{exp})+t \quad (5)$$

where I is the aligned face shape, S is the 3D face model, $R(\alpha, \beta, \gamma)$ is a 3×3 rotation matrix with $\alpha$, $\beta$, $\gamma$ rotation angles, m is a scale parameter, t is a translation vector, and P is the weak perspective transform.

Each 3DMM may be fitted to the object in each frame of the sequence of frames. Because the 3DMM is fitted to each frame in the sequence of frames, the accuracy of the 3DMM models may vary and may not be aligned. Further, an object can vary from frame to frame. For instance, a head of the person can also vary from frame to frame due to trembling, for example. As such, the 3DMM models can vary from frame to frame.

Figure 4B:
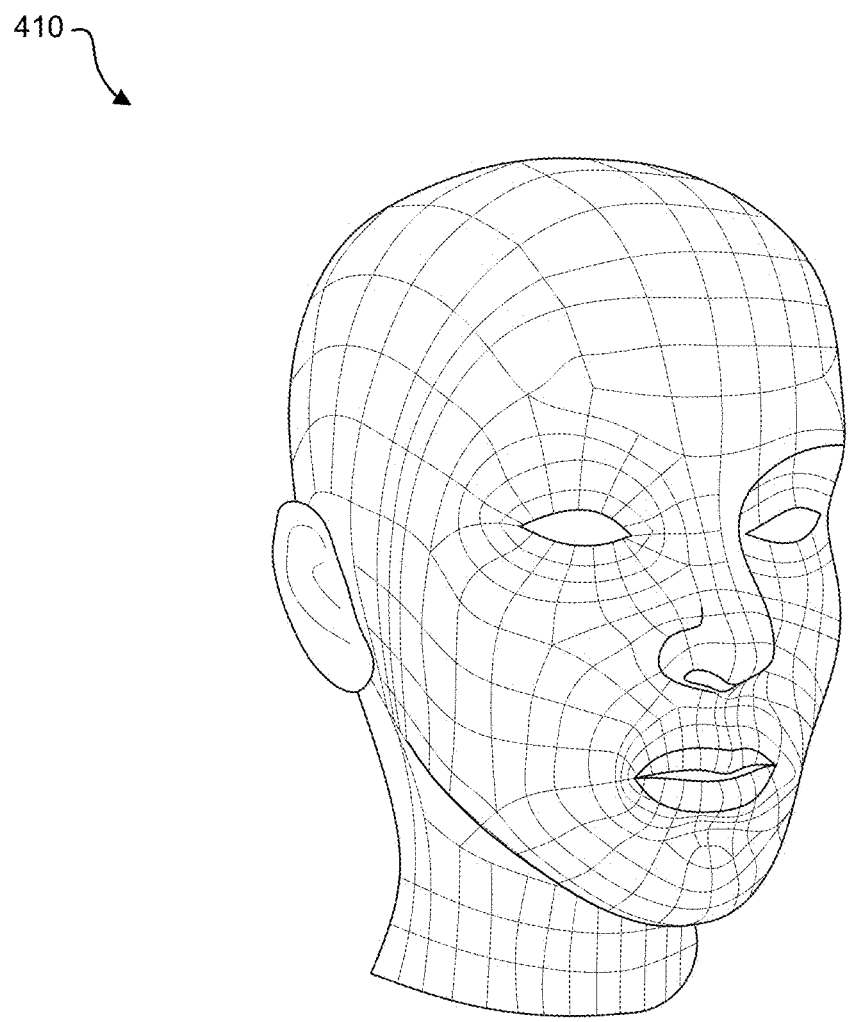
FIG. 4B is a diagram illustrating an example of a 3D morphable model (3DMM) of an object, in accordance with some examples.

FIG. 4B is a diagram illustrating an example of a 3DMM 410 of an object. In the example illustrated in FIG. 4B, the object corresponds to a person and models a head region of the person. The 3DMM 410 does not include non-rigid aspects of the person, such as the hair region or a clothing region. The 3DMM 410 can be morphed to depict various facial movement of the object (e.g., nasal region, ocular region, oral region, etc.). As an example, over a number of frames, the 3DMM 410 can change to allow illustration of the person speaking or facial expressions such as the person smiling. In other examples, an object can be any physical object, such as a person, an accessory, a vehicle, a building, an animal, a plant, clothing, and/or other object.

As noted above, a 3DMM may be generated for each frame in the sequence of frames. The different 3DMMs correspond to the movement of the object in the sequence of frames. In some examples, the 3DMM models can include positional information related to the position of first region of the object. In the example of the object being a head of a person, the positional information may include pose information related to a pose of the head. For example, the pose information may indicate an angular rotation of the head with respect to a neutral position of the head. The rotation may be along a first axis (e.g., a yaw axis) and/or a second axis (e.g., a pitch axis). In some examples, the pose information may include any physical characteristics that can be used to ascertain motion such as displacement (e.g., movement), speed, acceleration, rotation, and so forth.

The key frame selector 210 can select one or more frames (referred to herein as key frames) from the sequence of frames. In one illustrative example, the key frame selector 210 can select a reference frame from the sequence of frames. The key frame selector 210 can compare a similarity of a 3DMM model of the reference frame to other 3DMM models in other frames to determine whether the 3DMM models are aligned in space and time. For instance, the key frame selector 210 may analyze frames based on the alignment of the object while the object is moving in a direction (or as a camera is moving relative to the object when the object is stationary) during a first time period, may analyze frames when the object is moving (or the camera is moving) in an opposite direction (e.g., returning to the neutral position) during a second time. In some cases, the key frame selector 210 may analyze less frames when the object is moving (or the camera is moving) in the opposite direction during the second time. In the event that a comparison of another 3DMM of a frame is suitably correlated to the reference frame, that frame may be selected as a key frame. Each key frame can be selected to depict the object rotated at different angles and represent a particular range of movement (e.g., a range of rotations such 10° to 15°, 15° to 20°, etc.) of the object. Further details regarding a process to select key frames are described below with respect to FIG. 5.

The object analyzer 215 analyzes the key frames selected by the key frame selector 210 to identify different regions (e.g., segments) of the object. For instance, the object analyzer 215 can perform object segmentation to segment the object into different regions. In some examples, the object analyzer 215 can be implemented by a face parser that can parse the head of the person in a frame into different regions (e.g., a face region, a hair region, etc.). The object analyzer 215 can generate one or more object parsing masks for the different regions. An object parsing mask can indicate whether pixels in the frame correspond to one or more of the different regions. In some cases, an object parsing mask can include a 2D bitmap. In one illustrative example, the object analyzer 215 can generate an object parsing mask corresponding to a first region of the head (e.g., a facial region) and an object parsing mask corresponding to a second region of the head (e.g., a hair region). In some cases, the object analyzer 215 can generate an object parsing mask corresponding to both the first region and second region (e.g., the face region and hair region). For example, the object parsing mask of the first region and the second region may illustrate a silhouette of the person. In other cases, different masks may be generated based on properties of particular portion of the object (e.g., based on the hair of the person).

In some aspects, the object parsing masks can be used to generate a 3D model of a particular portion of the object (e.g., a 3D hair model of hair of the person). In some examples, the 3D base model generator 220 can generate a 3D base model from the object parsing masks and pose information provided from the 3D models of the first portion of the object. In an illustrative example, the 3D base model generator 220 generates an additional object parsing mask from the 3D model of a first portion of the object (e.g., 3DMM model) and the object parsing masks from the object analyzer 215. The additional object parsing mask is created by a union of the different regions (e.g., hair region, face region) and the 3DMM model, which will cause the resulting 3D models to be aligned (e.g., abut). After the object parsing masks are created, the 3D base model generator 220 then initializes a 3D model. Vertices of the initial 3D model can be selectively removed based on the additional object parsing masks to create the 3D base model. For example, the initial 3D model can be projected into 2D frames and objects parsing masks can be compared to the projected 2D frames. Further descriptions with respect to the projections from 3D into 2D are described below with respect to FIG. 8B.

In some examples, the 3D base model includes a 3D model of a first portion of the object and a 3D model of a second portion of the object. In the illustrative example from above, the first portion of the object is the head of the person and the second portion is the hair of the person. As described in more detail below, generating a 3D base model with 3D models for the first and second portions can ensure that the 3D model of the second portion is automatically aligned (e.g., abut) with and cannot collide with the 3D model of the first portion. As a result, undesirable visual artifacts can be reduced. Further details regarding the 3D base model generation are described below with respect to FIGS. 7, 8A, 8B, 8C and 8D.

The model extractor 225 can extract the 3D model of the second region from the 3D base model (e.g., extract the 3D model of the hair from the 3D base model). For instance, using the 3D base model created by the 3D base model generator 220, the object parsing masks, and the pose information, vertices in the 3D base model can be removed to arrive at the 3D model of the second region. Further details regarding extracting the 3D model of the second region are described below with respect to FIG. 9 and FIG. 10.

The system 200 illustrated in FIG. 2 illustrates a functional block diagram that can be implemented in hardware, software, or any combination of the hardware and software. As an example, the functional blocks illustrated can use the illustrated relationships to identify functional blocks that can be converted into a universal modeling language (UML) diagram to identify an example implementation of the system 200 at least partially as an object oriented arrangement in software. However, the system 200 can be implemented without abstractions and, for example, as static functional implementations.

Figure 5:
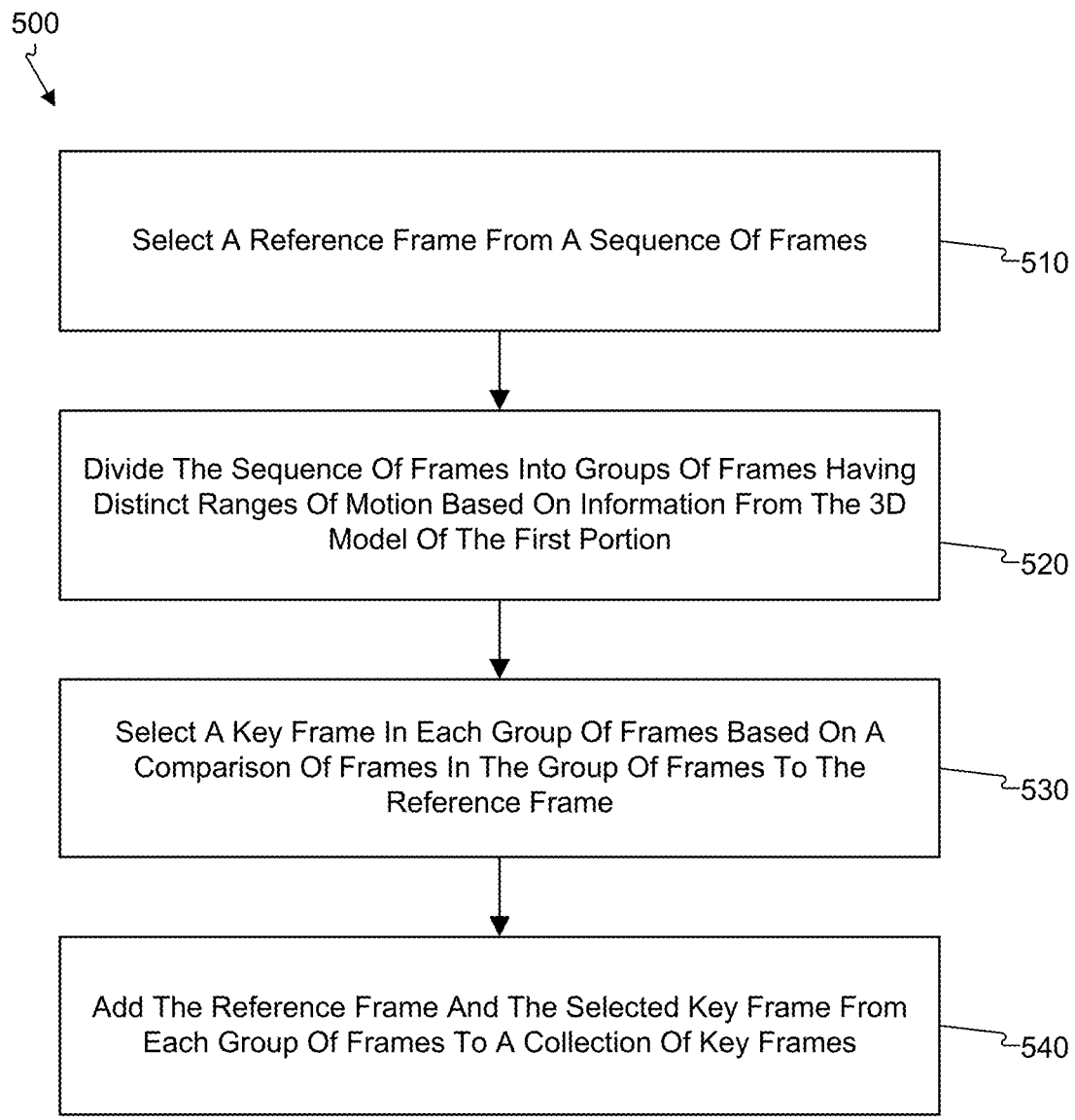
FIG. 5 is a flowchart illustrating an example of a process for selecting key frames from a sequence of frames of an object, in accordance with some examples.

FIG. 5 illustrates a process 500 for selecting key frames from a sequence of frames of an object using the 3D models of the first portion of the object. As described above, the 3D object modeler 205 creates a 3D model of the first portion of the object for each frame. In some examples, the process 500 may be implemented by the key frame selector 210 illustrated in FIG. 2 to create a collection of key frames from the sequence of frames. As will be described below, the key frames are selected based on comparisons of the 3D models of the first portion of the object.

At block 510, the process 500 can select a reference frame from the sequence of frames. The reference frame can be identified based on a 3D model of the first portion having a neutral or unbiased position. In an illustrative example of the object being the head of the person, the reference frame may be the first frame of the sequence of frames and depicts the head in a neutral position (e.g., a rotation of 0°). FIG. 3 illustrates an example of a frame 310 that may be deemed a reference frame because the frame 310 is the first frame in the sequence of frames. In some examples, the first frame of the sequence of frames may have a corresponding 3D model of the first portion rotated at a slight angle (e.g., 0.3°) and a subsequent frames with 3D models having no rotation (e.g., 0.0°) may be selected as the reference frame. In such a case, a subsequent frame may be deemed the reference frame.

At block 520, the process 500 can divide the sequence of frames into groups of frames based on position information from the 3D model of the first portion. In an illustrative example of the sequence of frames each having a 3DMM model, each frame may be associated with pose information such as an angle of rotation of the 3DMM model. The sequence of frames can be divided into groups based on the pose information. In the example of the object being a head of a person that rotates in the sequence of frames, the groups can be separated based on the position of the object (e.g., a first group for 0° to 5°, a second group for 5° to 10°, a third group for 10° to 15°, etc.) with respect to rotation toward their right side (e.g., +60°) and/or left side (e.g., −60°).

For example, the frames from the sequence of frames are separated into different groups based on the movement range depicted in the frames. As will be described below, a key frame will be determined from each group. In this example, the quantity of groups is based on a desired visual fidelity and time consumption required to generate the models. For example, more key frames will lead to better visual fidelity but will require more computing time. In addition, the quantity of groups should be large enough to cover the range of movement of the object. In some examples, each frame can be deemed a key frame.

FIG. 3 illustrates an example frame 320 depicting a +60° rotation of the head of the person that can be selected as a key frame for different group of frames (e.g., +55° to +65°, +59.5° to +63°, +60° to +62°, etc.) based on the quantity of key frames. FIG. 3 illustrates an example key frame 330 depicting a −60° rotation of the head of the person that is selected for another group of frames (e.g., −55° to −65°, −59.5° to −63°, −60° to −62°, etc.).

The frames selected at block 520 may not necessarily be contiguous in time. In one illustrative example, the sequence of frames can illustrate the person rotates their head toward their right side and then to their left side. For example, the sequence of frames may include a first set of frames that depict the head rotating from 5° to 10° at a first time. The sequence of frames may also include a second set of frames that depict the head rotating from 10° to 5° as the head move towards the left side at a second time.

At block 530, the process 500 can select a key frame in each group of frames based on a comparison of frames in the group of frames to the reference frame. In one illustrative example, the process 500 identifies the best frame in the group having a 3DMM that is best assigned to the 3DMM in the reference frame.

In an illustrative example, the comparison of the frames can be performed using an intersection over union (IOU) based on the 3D models of the first portion. As noted above, a 3DMM can be generated and fit to each frame in the sequence of frames. This can result in alignment differences in the 3DMM models. For example, a reference frame (e.g., having a neutral head position) can be generated (e.g., rasterized) into a reference 2D frame and a first frame in the group can also be generated into a first 2D frame. For example, to rasterize a 3D model of the reference 2D frame, a camera (e.g., a camera model) and a light can be positioned in the 3D coordinate system of the reference 3D model. A rendering engine can calculate the effects of the light as projected onto vertices of the reference 3D model based on the camera position to generate a 2D bitmap that visually depicts the reference 3D model. In some examples, the 3D models may be compared in 3D coordinate systems without rasterizing the 3D models into 2D bitmaps.

An IOU is performed to determine a similarity (e.g., a correlation or a value) between the reference 2D frame and the first 2D frame. For example, an IOU can be used to determine if an object detected in the current frame matches an object detected in the previous frame. An IOU includes an intersection I and union U of two bounding boxes, including first bounding box of an object in a current frame and second bounding box an object in the previous frame. The intersecting region includes the overlapped region between the first bounding box and the second bounding box. The union region includes the union of first bounding box and second bounding box. The first bounding box and the second bounding box can be determined to match if an overlapping area between the first bounding box and the second bounding box divided by the union of the bounding boxes is greater than an IOU threshold.

The IOU comparison is just one example comparison and other techniques can be employed. For example, a differential mask can be generated using an exclusive OR based on the values in the reference 2D frame and the first 2D frame. A resulting bitmap would indicate the area of the differences between the frames and can be measured to determine a similarity between the reference 2D frame and the first 2D frame.

In some examples, additional comparisons to other frames in the group of frames can be made. In the event that a second frame has a higher similarity, the second frame can be selected as the key frame for that group of frames. In this case, the second frame would replace the first frame as the key frame.

After selecting each key frame for each group of frames, the process 500 adds the reference frame and the selected key frame from each group of frames to a collection of key frames at block 540. In one illustrative example, the collection of key frames is provided to the object analyzer 215. The object analyzer 215 can analyze the key frames to identify different regions (e.g., segments) of the object. For instance, the object analyzer 215 can perform object segmentation to segment the object into different regions.

Figure 6A:
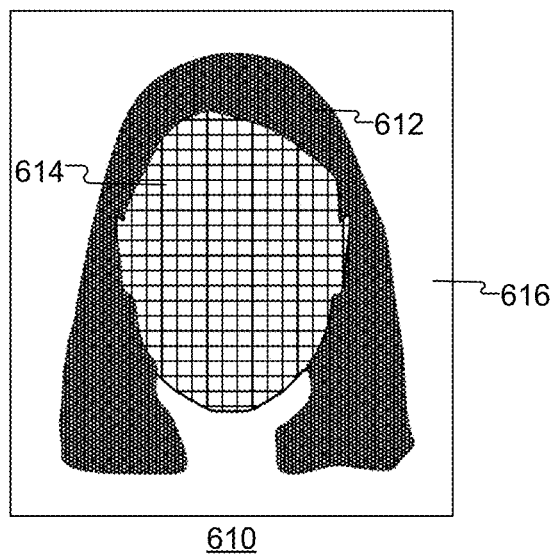
FIG. 6A illustrates a result of object analysis of a portion of the key frames of FIG. 3, in accordance with some examples.
Figure 6A:
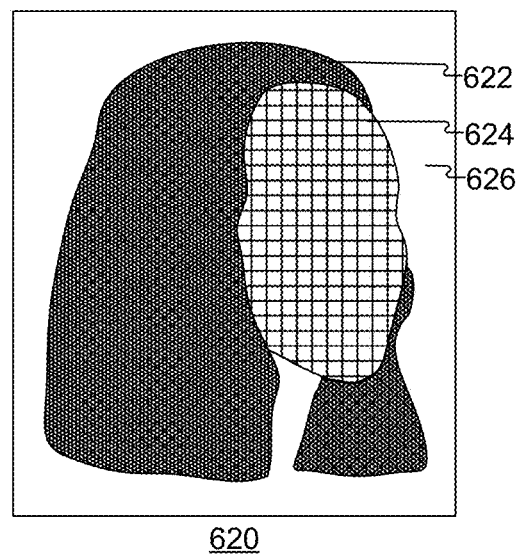

FIG. 6A illustrates a result of object analysis of the frame 310 and key frame 330 that is performed by the object analyzer 215. In this instance, a segmenting result 610 of the frame 310 illustrates a hair region 612 of the person and a face region 614 of the person. A region 616 corresponds to a region other than the head of the person. A segmenting result 620 of the frame 330 illustrates a hair region 622 of the person's hair and a face region 624 of the person. A region 626 corresponds to a region other that the head of the person.

While FIG. 6A illustrates a segmenting by the object analyzer 215, the object can be segmented in more detail based on the features that are being modeled. For instance, if a scarf was to be modeled, the segmenting of features may need to detect physical objects proximate to the head of the person and may identify finer details such as nasal region, ocular region, oral region, etc.

In some examples, the object analyzer 215 can be implemented by a face parser that can parse a head in a frame into different regions (e.g., a face region, a hair region, etc.). The object analyzer 215 can generate one or more object parsing masks that indicates whether pixels in a frame correspond to one or more regions. In one illustrative example, an object parsing mask can include a 2D bitmap. In some cases, as described in more detail herein, the object parsing masks can be used to generate a 3D model of a particular portion of the object (e.g., a 3D hair model of hair of a person). In some cases using a person's head and hair as examples of portions of a person, the object analyzer 215 can generate an object parsing mask corresponding to the face of the person, an object parsing mask corresponding to the hair of the person, and in some cases an object parsing mask corresponding to the hair and face of the person. In other cases, different masks may be generated based on properties of particular portion of the object (e.g., based on the hair of the person).

Figure 6B:
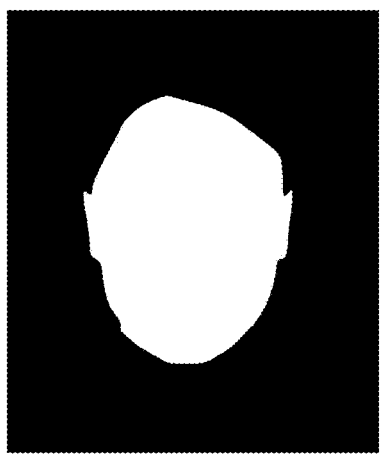
FIG. 6B illustrates different object parsing masks that can be generated from a result of object analysis of the key frames of FIG. 3, in accordance with some examples.
Figure 6B:
Figure 6B:
Figure 6B:
Figure 6B:
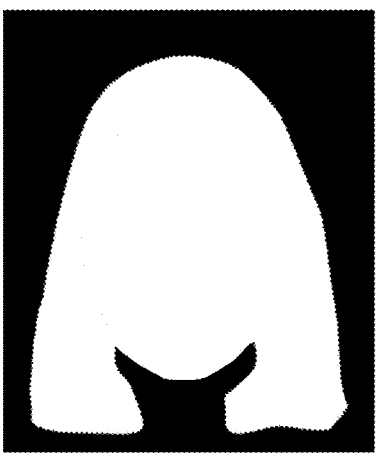
Figure 6B:
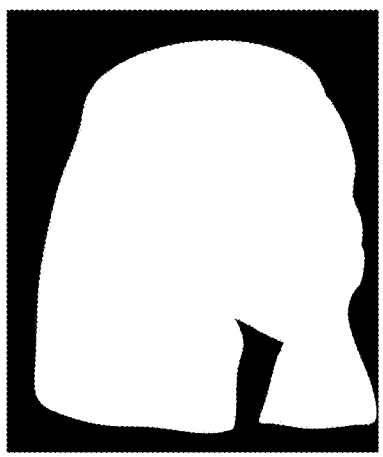

FIG. 6B illustrates different object parsing masks that can be generated from the result of object analysis of frame 310 and frame 330. Each object parsing mask indicates presence of a region of the object identified by the object analyzer 215. In particular, the white region (e.g., a white value of 255) of the object parsing mask indicates that the coordinate of the object parsing mask corresponds to the region of the object. A black region (e.g., a white value of 0) indicates that the coordinate of object parsing mask frame does not correspond to the region of object.

In the example illustrated in FIG. 6B, the object parsing mask 630, object parsing mask 650, and object parsing mask 670 are derived from the object analysis of the key frame 310. As described above, key frame 310, which as noted above is also deemed the reference frame, illustrates a frontal view of the person with no rotation of the person's head on the yaw axis (i.e., 0° rotation). Similarly, object parsing mask 640, object parsing mask 660, and object parsing mask 680 are derived from the object analysis of key frame 330. As described above, key frame 330 illustrates the person rotates their head −60° on the yaw axis person.

The object parsing mask 630 identifies a face region of the person with no rotation of the head with respect to the cervical region. The object parsing mask 640 identifies the face region when the head is rotated −60° with respect to the cervical region. The object parsing mask 650 identifies a frontal view of the hair region of the person with no rotation of the head. The object parsing mask 660 identifies the hair region with the head rotated −60° with respect to the cervical region. The object parsing mask 670 identifies a facial and head region (e.g., a silhouette) of the person with no rotation of the head with respect to the cervical region. The object parsing mask 680 identifies the facial and hair region when the person's head rotates −60° with respect to the cervical region.

Figure 7:
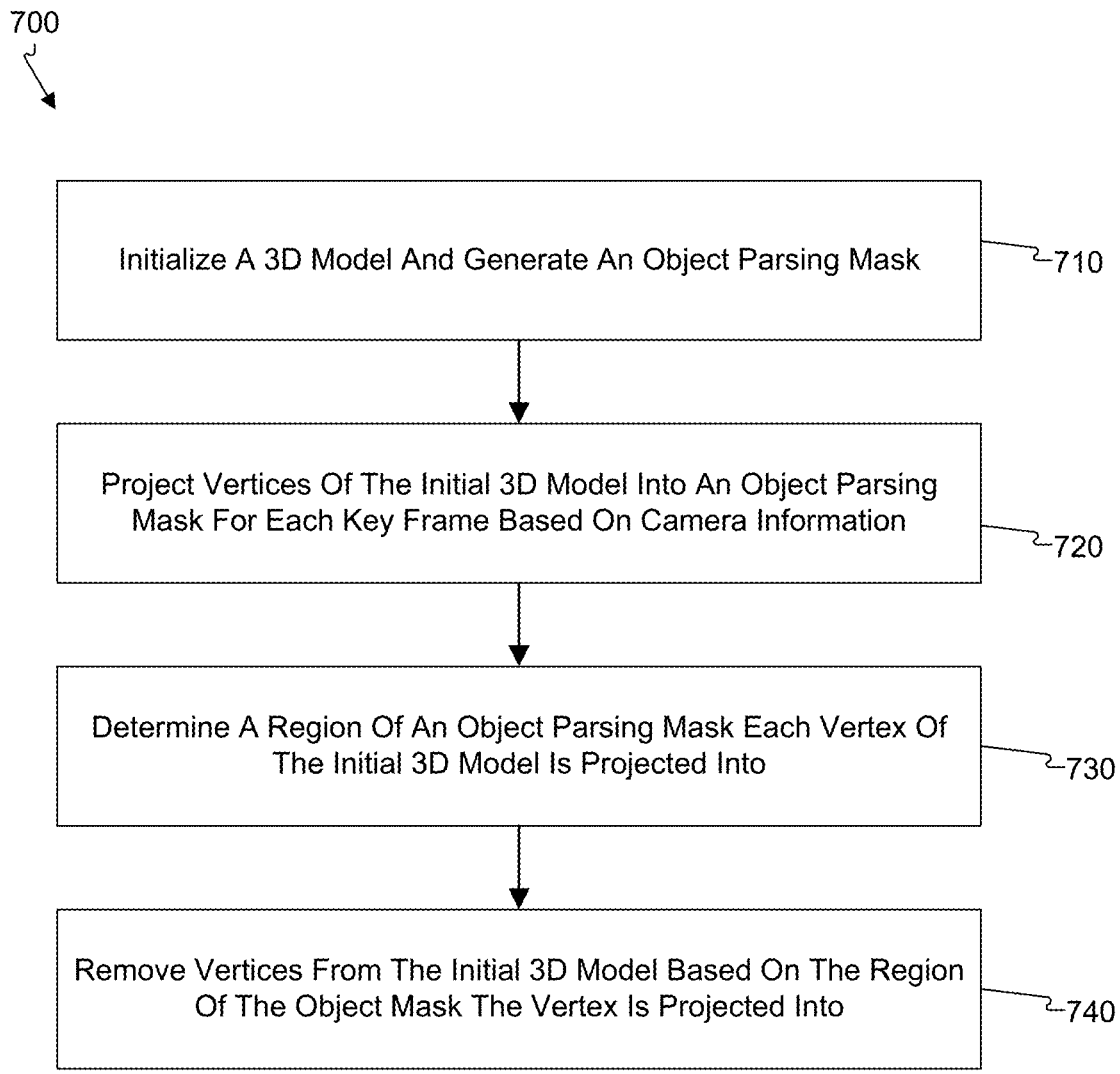
FIG. 7 is a flowchart illustrating an example of a process for generating a 3D base model that corresponds to a first region of an object and a second region of the object, in accordance with some examples.

FIG. 7 illustrates a flowchart of a process 700 for generating a 3D base model that corresponds to the first region of the object and the second region of the object. In one example, the process 700 can be performed by the 3D base model generator 220 illustrated in FIG. 2.

The process 700 initializes a 3D model and generates an object parsing mask for each key frame at block 710. In some examples, the initial 3D model can be any shape that can be applied to the process 700 to create a 3D base model. In an illustrative example, the 3D model is a default shape such as a 3D cube. As will be described in further detail below, using the object parsing mask generated at block 710, vertices of the initial 3D model can be removed to create the 3D base model that encapsulates the 3D model of the first portion and the 3D model of the second portion.

At block 720, the process 700 projects vertices of initial 3D model into the object parsing mask based on pose information associated with the 3D model of the first portion. In an illustrative example of a head, the pose information of a 3DMM may indicate an angular rotation of the head. Each vertex of the initial 3D model will be projected from the 3D coordinate system into a 2D coordinate system based on a camera positioned according to the pose information. For example, if the pose information of the object is rotated 15° on the yaw axis, a camera is positioned at 15° along an arc and each vertex of the initial 3D model is projected into the camera to generate a 2D bitmap. The projection of the 3D coordinate system into the 2D coordinate system will be explained in further detail in FIG. 8B.

At block 730, the process 700 determines a region of the object parsing mask that each vertex of the initial 3D model is projected into. In an example where the initial 3D model is projected into the key frame 310 and the camera is positioned based on the pose information of the 3DMM (e.g., 0°), the vertices of the key initial 3D model are projected onto the object parsing mask to determine whether the vertex is within the head and hair region (e.g., a silhouette) or outside the head and hear region.

At block 740, the process 700 removes vertices from the initial 3D model based on the region of the object parsing mask the vertex is projected into. In the example from where the initial 3D model is projected into the key frame 310, vertices that are projected outside of the object parsing mask are removed. Vertices that are projected inside of the object parsing mask are preserved.

Figure 8A:
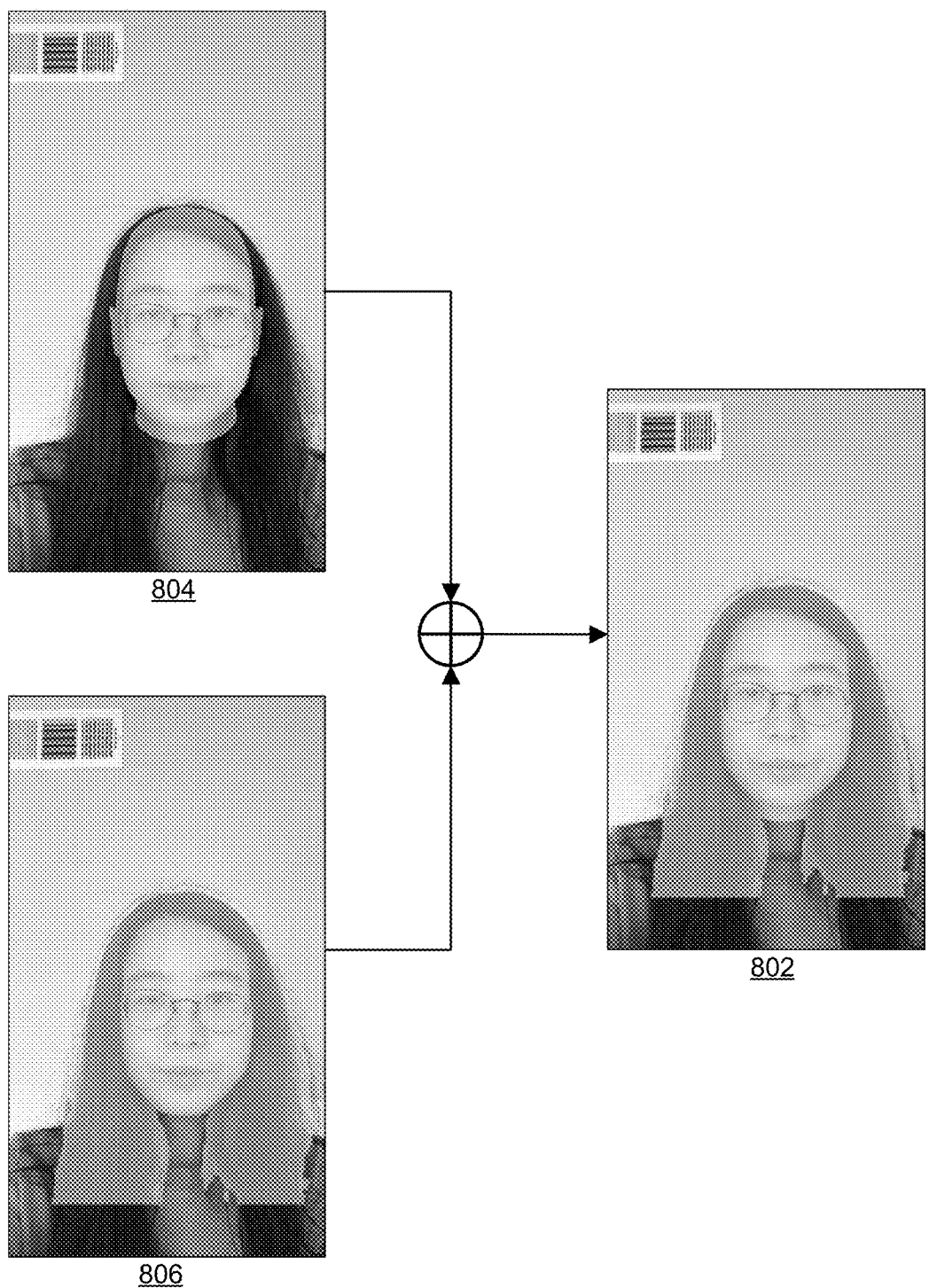
FIG. 8A is a diagram illustrating creation of an object parsing mask that will be used to create a 3D base model, in accordance with some examples.

FIG. 8A is a diagram illustrating creation of an object parsing mask 802 that will be used to create a 3D base model. For example, the 3D base model generator in FIG. 2 may create the object parsing mask 802 based on an output (e.g., object parsing masks 806) from the object analyzer 215 and the 3D model of the first portion of the object 804 (a head of a person in the example of FIG. 8A) from the 3D object modeler 205. In some examples, the object parsing mask 802 is generated based on a union of rasterizations of the 3D model of the first portion of the object 804 (e.g., a 3DMM model) and object parsing masks 806. As will be described in further detail below, the object parsing mask 802 represents an outer boundary of a second portion of the object 804 (hair on the head of the person in the example of FIG. 8A) and ensures alignment with respect to the first portion of the object (e.g., there is alignment between a model representing the head and a model representing the hair). A rasterization of the 3D model of the first portion of the object 804 is aligned to cause the head or cranium region of the 3D model of the first portion of the object 804 to be bounded by (e.g., within) the object parsing masks 806. In this example of FIG. 8A, the object parsing masks 806 identify both a first region (e.g., the face region) and a second region (e.g., the hair region) of the person depicted in the image. In this example, a union of the 3D model of the first portion of the object (the head of the person 804 in FIG. 8A) and the object parsing masks 806 creates the object parsing mask 802, which will automatically align the 3D model of the first portion of the object (e.g., the 3D model of the head) with the 3D model of the second portion of the object (e.g., the 3D model of the hair).

In the illustrated example, the 3D model of head portion (the first portion) of the object 804 is almost entirely bounded by the object parsing masks 806 because the hair region of the object parsing masks 806 is extensive. Hair regions can be much smaller (e.g., when the object is rotated, when the person has smaller and less dense hair regions, etc.) and segmentation of the hair region using the object parsing may not be accurate. Thus, aligning the 3D model of the head portion (the first portion) of the object 804 with the object parsing masks 806 ensures alignment and accuracy when the object parsing mask 802 is used to create the 3D base model.

Figure 8B:
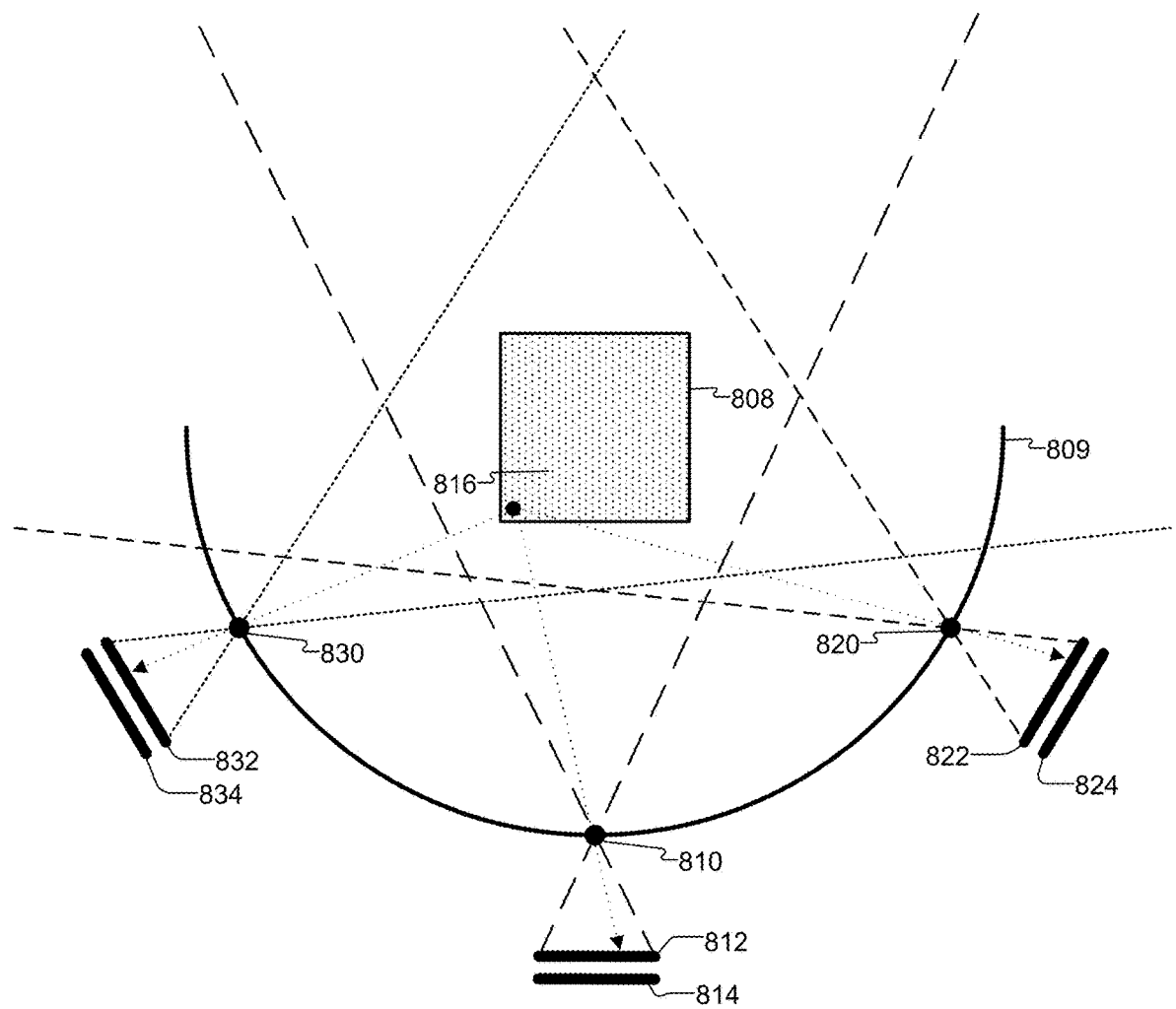
FIG. 8B is a diagram illustrating an example of a 3D scene including a 3D model can be projected into a two dimensional (2D) coordinates system for comparison to object parsing masks, in accordance with some examples.

FIG. 8B illustrates a top view of a 3D scene that will be projected into 2D bitmaps. In one illustrative example, an initial 3D model 808 is statically positioned at a center point of an arc 809. In an illustrative example, a camera 810 can be positioned along the arc 809 to render the scene based on pose information of a 3DMM model representing a portion of a person (e.g., a head or upper body and head of the person). For instance, the camera 810 is positioned at 0° in FIG. 8B and would correspond to a camera position of the key frame 310 because the head of the person is rotated 0°. The camera can be an ideal pinhole camera model that describes mathematical relationships between coordinates of the camera position in the 3D space and a projection onto an image plane 812. For instance, a representation of the initial 3D model 808 is projected into the image plane 812 and represented as a 2D bitmap.

A bitmap on the image plane 812 can be compared to a bitmap 814 to determine whether the vertex corresponds to a particular region. For example, because the bitmap on the image plane 812 and bitmap 814 are 2D, the bitmap on the image plane 812 can be aligned with the bitmap 814 and compared based on 2D position. In the example that the bitmap 814 is an object parsing mask that identifies a region of the frame (e.g., a first region such as a hair region being identified by a particular pixel value, such as a value of 1 or 0), each vertex in the initial 3D model can be mapped to the regions within the object parsing mask. In an example when the bitmap 814 is the object parsing mask 670, the vertex can be determined to be inside or outside of the silhouette of the person in key frame 310. For example, when the vertex 816 of the initial 3D model 808 is projected into the image plane 812, the vertex 816 can be identified as being inside or outside of the silhouette based on the bitmap 814. As noted above, this occurs for each vertex of the initial 3D model 808.

Further, a camera 820 may be positioned at +60° in FIG. 8B to project the initial 3D model 808 into another key frame. The camera 820 can be the same camera or a different camera than the camera 810. For example, the camera 820 may correspond to a camera position used to capture the key frame 330. A different representation of the 3D space is projected by the camera 820 in the image plane 822 because the camera 820 is located at a different location as compared to the camera 810. Projections into the image plane 822 can be compared to another bitmap 824 to determine whether a vertex (e.g., vertex 816) is inside or outside of an object parsing mask. In some examples, the vertex 816 may be mapped to a different position in the image plane 822 than in the image plane 812.

Further, a camera 830 may be positioned at −60° in FIG. 8B to project the initial 3D model 808 into other key frames. The camera 830 can be the same camera or a different camera than the camera 810 and/or the camera 820. For example, the camera 830 may correspond to a camera position used to capture the key frame 320. A different representation of the 3D space is projected by the camera 830 an image plane 832 of the camera 830. Projections into the image plane 832 can be compared to another bitmap 834 to determine whether the vertex 816 is inside or outside of an object parsing mask. In some examples, the vertex 816 may be mapped to a position in the image plane 832 that is different from the image plane 812 and the image plane 822.

Figure 8C:
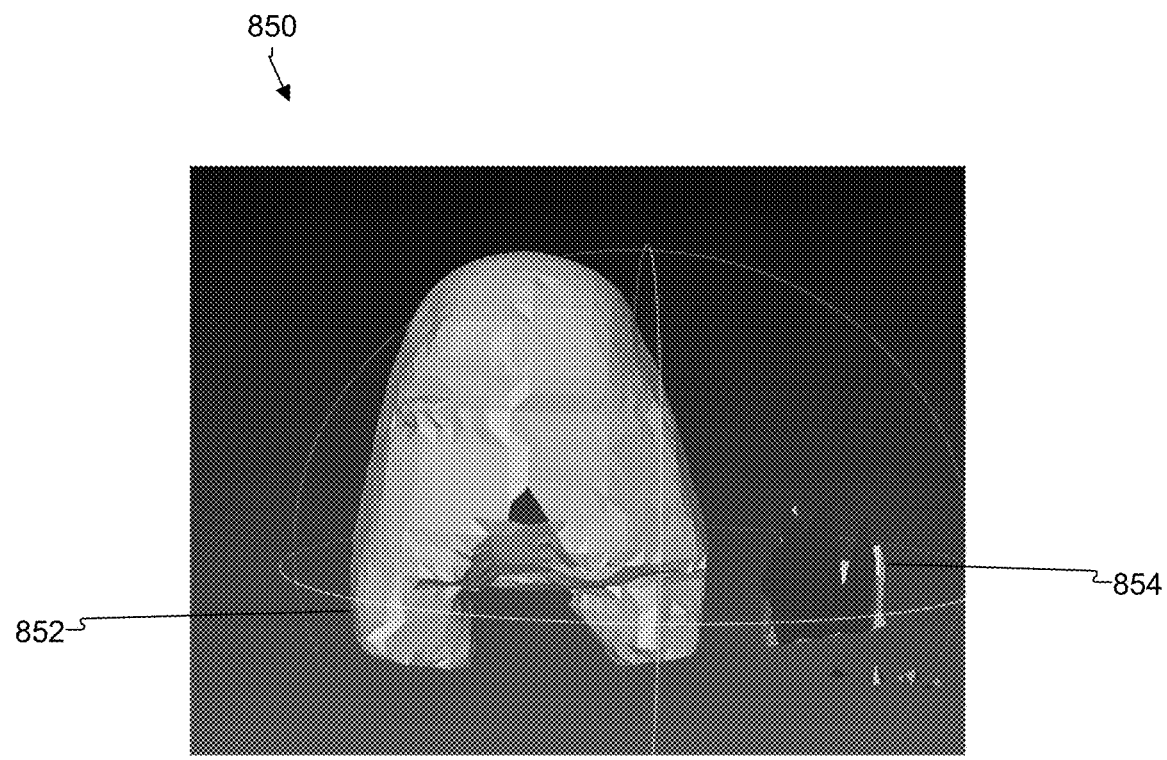
FIG. 8C is a diagram illustrating an example of a 3D base model that corresponds to a first region of an object and a second region of the object, in accordance with some examples.
Figure 8D:
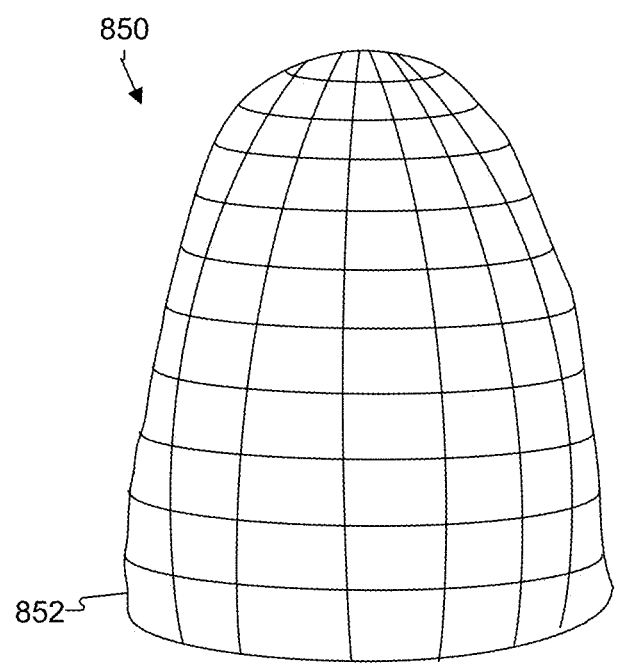
FIG. 8D is a diagram illustrating the example 3D base model of 8C after post-processing, in accordance with some examples.

FIG. 8C illustrates an example 3D base model 850 that is generated by systems and techniques describe herein. The 3D base model 850 comprises a union of the first region of the object, the second region of the object, and the rasterization of the 3D model of the first portion (e.g., a 3DMM model). A portion of the 3D base model 800 includes an outer boundary 852 that at least partially corresponds to an outer boundary of the object. In the case of a person's face corresponding to the object, the outer boundary can corresponds to the person's hair region. For example, a 2D representation of the 3D base model has a high correlation to an object parsing mask 670. However, the outer boundary can also correspond to the person's skin in the event hair is not present.

As noted above, the process 700 selectively removes portions of an initial 3D model. In the illustrative example of the head of the person, a silhouette of the person is used to remove regions of the initial 3D model that are not associated with the head. As a result, the 3D base model 850 appears to be a cone that encompasses both the head and the hair of the person. Thus the process 700 removes outer boundaries of the initial 3D model.

In some examples, the 3D base model 850 may include vertices 854 that are inadvertently preserved. In some examples, a post-processing process may be implemented to remove errors. For instance, a Laplacian smooth operation may be implemented to remove vertices 854 to create a 3D base model 850 illustrated in FIG. 8D.

In some examples, because the 3D base model 850 is constructed based on a combination of the object parsing masks and the pose information that corresponds to the object parsing masks, the 3D base model 850 is aligned with and scaled to the 3D model of the first portion. Further, a least a part of outer boundary of the 3D base model 850 is determined based on a boundary identified by the object parsing masks.

Figure 9:
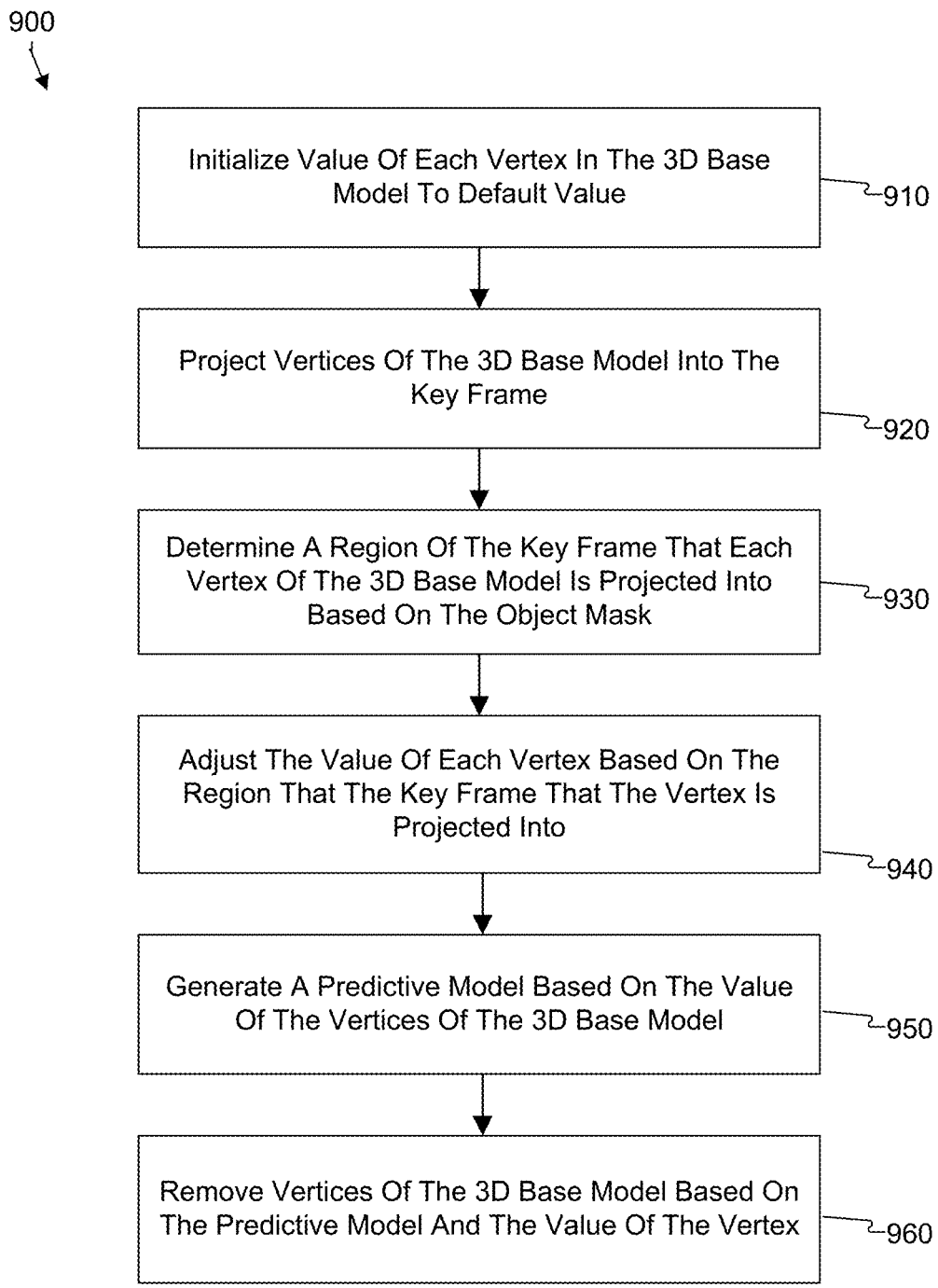
FIG. 9 is a flowchart illustrating an example of a process for generating a 3D model for a second object using a 3D base model, in accordance with some examples.

FIG. 9 illustrates a flowchart of a process 900 for generating a 3D model for the second object. In one example, the process 900 can be performed by the model extractor 225 illustrated in FIG. 2.

At block 910, the process 900 includes initializing a value of each vertex of a 3D base model to a default value. For example, the model extractor 225 illustrated in FIG. 2 may initialize a value of each vertex of the 3D base model to a default value. In some examples, the initial value of the vertex is a value of one, but any value may be selected. As will be described in detail below, the values of the vertex of the 3D base model correspond to whether the vertex is preserved in the 3D model of the second region (i.e., the vertex corresponds to the 3D model of the second object) or is absent (e.g., removed) from the 3D model of the second region. The vertices are each set to a default value to indicate that the vertex corresponds to the second region of the 3D model, which allows content in the 3D model that is not modeled and should not be visible to be associated with the second region. For example, in the case that the object is a person's head, the sequence of frames may illustrate ±60° rotation of the persons head and the occipital region (i.e., the back of the person's head) cannot be directly modeled based range of motion to model and on the available sequence of frames. In this case, setting a default value will force at least a portion of the occipital region to be covered by the model of the second region (i.e., hair region).

At block 920, the process 900 projects the vertices of the 3D base model into a key frame. For example, the model extractor 225 illustrated in FIG. 2 may project the vertices of the 3D base model into an object parsing mask of each key frame. As described above, the vertices of the 3D base model can be projected from 3D into 2D based on pose information that corresponds to the 3DMM model of the key frame.

At block 920, the process 900 determines a region of the key frame that each vertex of the 3D base model is projected into based on the object parsing mask. In some examples, the object parsing mask may identify a region that the vertex is projected into. In an illustrative example, the object parsing mask may identify a hair region of the person, such as object parsing mask 650 and object parsing mask 660. In some example, the object parsing mask may identify another region (e.g., the face region).

At block 930, the process 900 adjusts the value of each vertex based on the region of the key frame that the vertex is projected into. In an illustrative example, when the vertex is projected in the hair region, the value of the vertex can be incremented. If the vertex falls into a region other than the hair region, the value of the vertex can be decremented. In other example, the face region can be used to adjust the value of the vertex.

At block 940, the process 900 includes generating a predictive model based on the value of the vertices. In some examples, the predictive model is generated by performing a mean value of all vertices of the 3D base model based on the projections describe above in blocks 910 to 930.

At block 950, the process 900 comprises removing vertices of the 3D base model based on the predictive model and the value of the vertex. In an illustrative example, each vertex having a value of less than the mean value is removed and other vertexes are preserved. In effect, vertices of the 3D base model that are identified as not being associated with the second region are removed from the 3D base model to create the 3D model of the second portion.

In the example of the head of the person, the second region corresponds to hair regions in different object parsing masks, and the 3D model of the second portion corresponds to the hair of the person. For example, content from the 3D base model that does not correspond to the second region is subtracted from the 3D base model to create the 3D model of the second portion.

In one illustrative example, a 3D model of the second region is automatically aligned with (e.g. does not visibly collide with) the 3D model of the first portion because the 3D base model is derived from a union of the first region of the object, the second region of the object, and the rasterization of the 3D model of the first portion (e.g., a 3DMM model). In some examples, the 3D model of the second region abuts at least a portion of the 3D model of the first portion. For example, the outer boundaries of the 3D model of the second region are determined based on the object parsing masks to cause the 3D model of the second region to overlap the 3D model of the first portion. Thus, subtracting content from the 3D base model as described above will cause the resulting 3D model of the second region to be aligned and scale with the 3D model of the first portion. The 3D model of the second portion also is formed in a manner that will prevent any visible collisions with the 3D model of the first portion.

Figure 10:
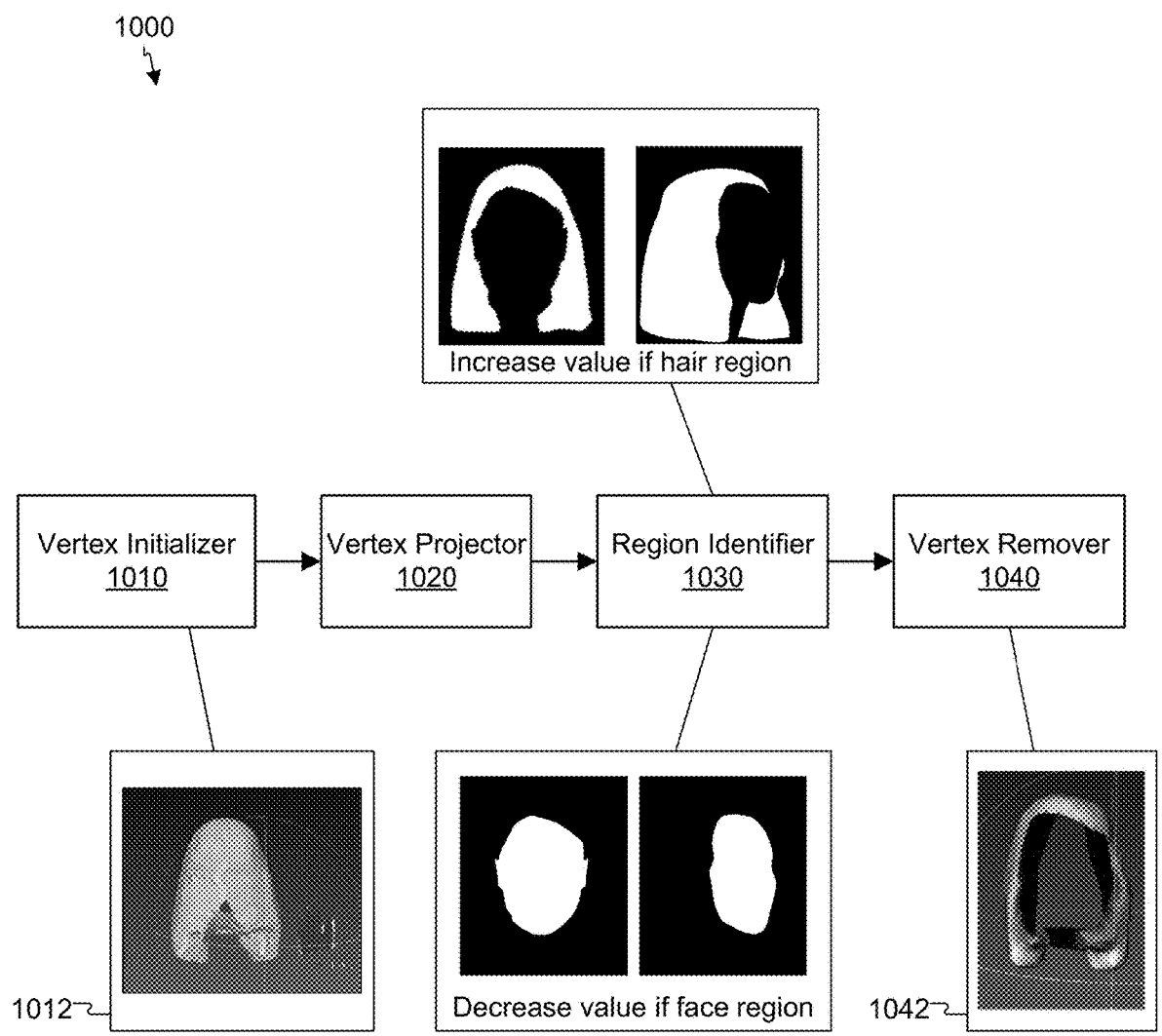
FIG. 10 is a diagram illustrating an example model extractor that may generate a 3D model for the second object from a 3D base model, in accordance with some examples.

FIG. 10 is a diagram illustrating an example model extractor 1000 that can generate a 3D model for the second object from a 3D base model based on the method 900. As shown in FIG. 10, the model extractor 1000 includes a vertex initializer 1010, a vertex projector 1020, a region identifier 1030, and a vertex remover 1040.

In some examples, the vertex initializer 1010 can initialize a value of a 3D base model 1012 to a default value. The vertices are each set to a default value to indicate that the vertex corresponds to the second region of the 3D model, which allows content in the 3D model that is not modeled and should not be visible to be associated with the second region. The vertex projector 1010 projects the vertices of the 3D base model 1012 into a key frame using, for example, pose information that corresponds to the 3DMM model of the key frame.

The region identifier 1030 determines a region of the key frame that each vertex of the 3D base model is projected into based on the object parsing mask. The region identifier 1030 may also change a value of the vertex based on the region of the key frame. For instance, if the vertex is projected into the hair region of the object parsing mask, the value of the vertex may be increased to preserve the vertex has corresponding to a 3D model of the second portion. On the other hand, if the vertex is projected into the face region of the object parsing mask, the value of the vertex may be decreased to remove the vertex as not corresponding to the 3D model of the second portion.

A vertex remover 1040 may perform functions to remove the vertices of the 3D base model to create the 3D model of the second portion 1042. In some examples, the vertex remover 1040 may generate a predictive model by performing a mean value of all vertices of the 3D base model based on the projections and then removing vertices of the 3D base model based on the predictive model and the value of the vertex. In some examples, a vertex having a value less than a mean value is removed and a vertex having a value greater than the mean is preserved. The resulting 3D model of the second portion 1042 is aligned with the 3D model of the first portion because the 3D base model was created based on a union of the first portion (e.g., a head region), the second region (e.g., a hair region), and the 3D model of the first portion of the object.

Figure 11:
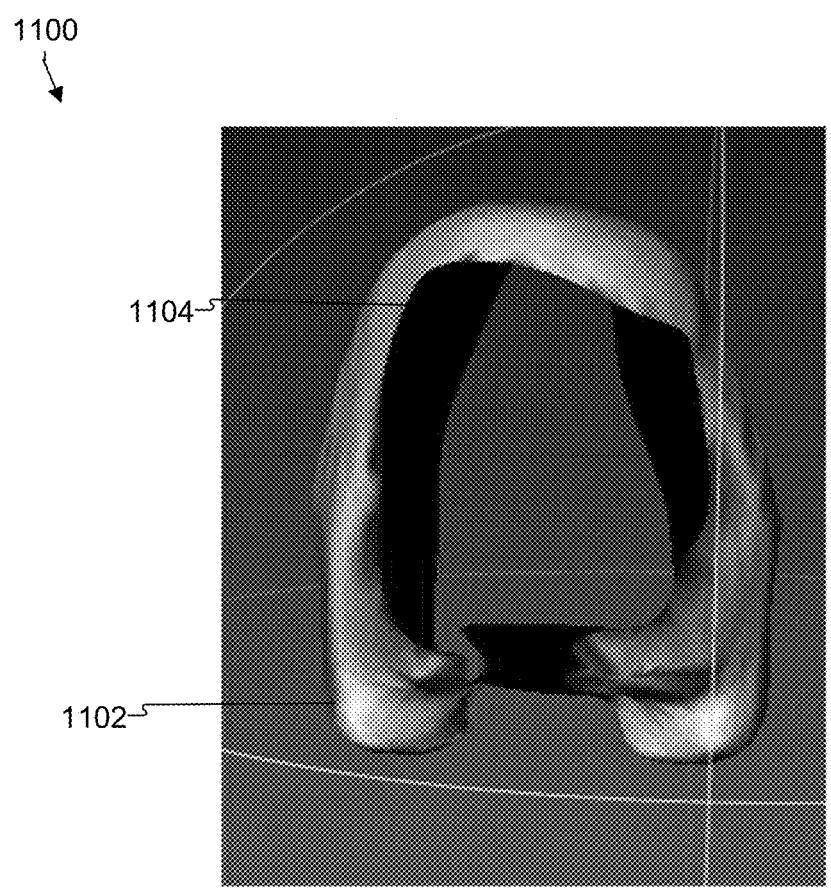
FIG. 11 illustrates a 3D model of a second region that is generated using a 3D base model, in accordance with some examples.

FIG. 11 illustrates a 3D model of a second portion 1100 that is generated by systems and techniques describe herein. As described in detail above, the 3D base model is created by removing content from outer surfaces. In one illustrative example, the 3D model of the second portion 1100 includes a surface 1102 that that at least partially derived from object parsing masks that create the 3D base model. Further, the 3D model is created by removing content from within the 3D base model based on object parsing masks that are encapsulated within the 3D base model. In some examples, the inner surfaces of the 3D model of the second portion are similar to and do not collide with outer surfaces of the 3D model of the first portion. In the illustrative example of the head and hair of the person, the 3D model of the first portion (e.g., the head) will not collide with the 3D model of the second portion (e.g., the hair).

Figure 12:
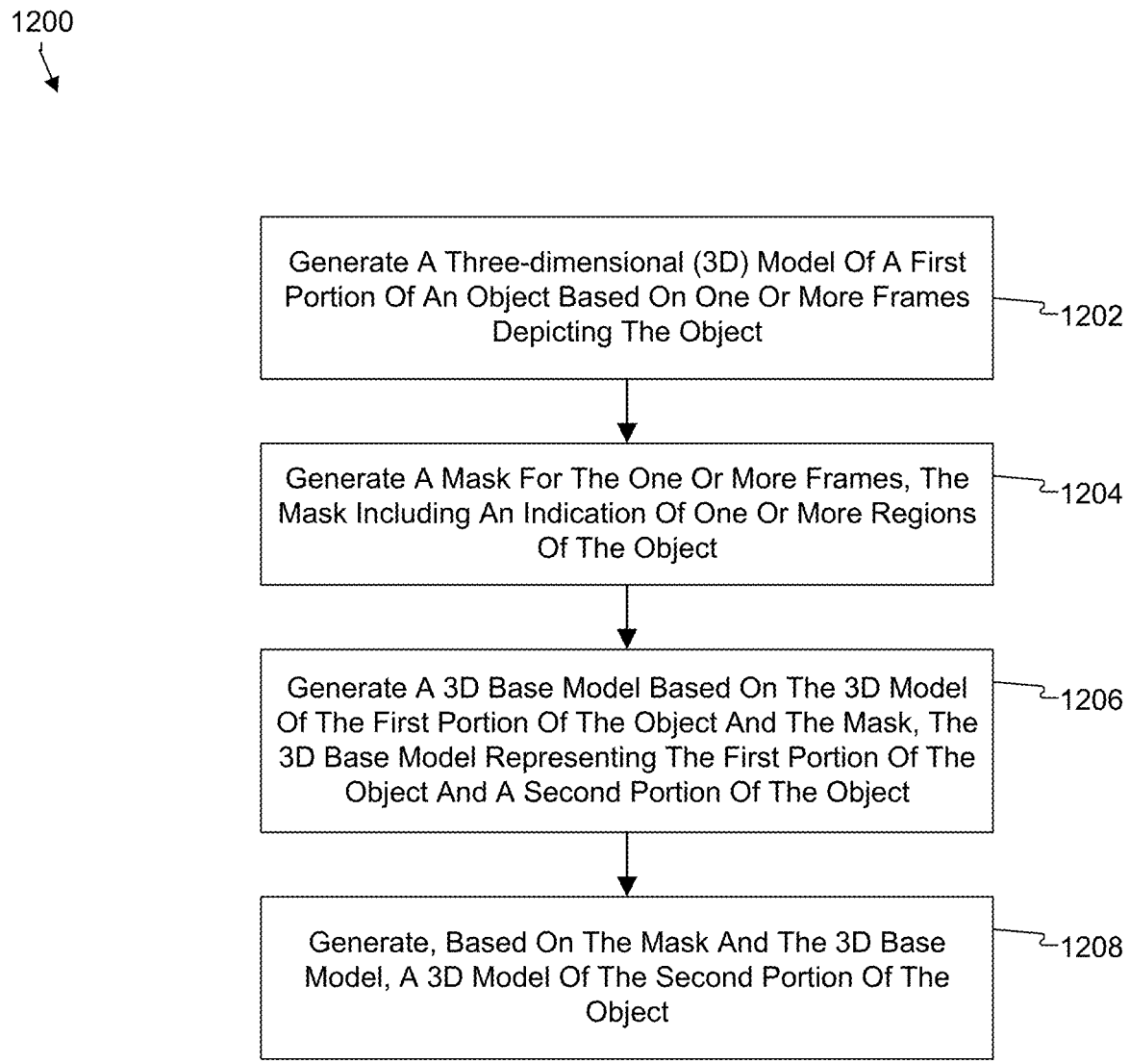
FIG. 12 is a flowchart illustrating an example of a process for generating one or more models, in accordance with some examples.

FIG. 12 illustrates an example of a process 1200 for generating one or more models. At block 1202, the process 1200 includes generating a three-dimensional (3D) model of a first portion of an object based on one or more frames depicting the object. For example, the 3D object modeler 205 illustrated in FIG. 2 may generate the 3D model of the first portion of the object based on the one or more frames. In some cases, the one or more frames may depict rotation of the object along a first axis. In some cases, the one or more frames may also depict a rotation of the object along a second axis. For instance, the first axis may correspond to a yaw axis and the second axis may correspond to a pitch axis.

According to some examples, the process 1200 includes selecting the one or more frames as key frames from a sequence of frames. For instance, the key frame selector 210 illustrated in FIG. 2 may select the one or more frames as key frames from a sequence of frames. In some examples, as noted above, each key frame depicts the object at different angles (e.g., based on the key frames being captured at different angles relative to the object). In some cases, to select the one or more frames as key frames, the process 1200 can include generating a first bitmap from the 3D model of the first portion of the object for a first angle selected along an axis. The process 1200 can include generating a first metric at least in part by comparing the first bitmap to a reference frame of the sequence of frames. In some cases, the comparison is performed by determining an intersection over union (IoU) of the first bitmap and a bitmap of the reference frame. For example, the first key frame may be selected based on the IoU being greater than an IoU threshold, as described above. After selecting the first key frame, the process 1200 can include generating a second metric at least in part by comparing the reference frame to a bitmap of a second frame of the sequence of frames. In this case, the process 1200 may identify a better frame (e.g., with a greater IoU as compared to the first key frame) and use the better frame as the key frame. In such cases, the process 1200 can include selecting the second frame as the first key frame based on the second metric.

In some cases, selecting the one or more frames may comprise functions to facilitate capturing additional content. For instance, the process 1200 may further include determining that the first key frame does not meet a quality threshold. In the event that the first key frame does not meet the quality threshold, the process 1200 can include outputting feedback to facilitate positioning of the object to correspond to the first key frame, capturing at least one frame based on the feedback, and inserting a frame from the at least one frame into the key frames.

At block 1204, the process 1200 includes generating a mask for the one or more frames. For example, the object analyzer 215 illustrated in FIG. 2 may generate an object parsing mask for the one or more frames, as described above. The mask includes an indication of one or more of regions of the object. In some cases, the process 1200 can include generating a first mask that identifies a first region and a second mask that identifies a second region. In one illustrative example, the object is a person, the first region is a face (or facial) region of the person, and the second region is a hair region of the person. In another illustrative example, the first region may correspond to a body region of the person and a dress region worn by the person.

At block 1206, the process 1200 includes generating a 3D base model based on the 3D model of the first portion of the object and the mask. The 3D base model may represent the first portion of the object and a second portion of the object. In some examples, the 3D base model generator 220 illustrated in FIG. 2 may generate the 3D base model based on the 3D model of the first portion of the object and the mask.

In some aspects, to generate the 3D base model, the process 1200 can include projecting each vertex of an initial 3D model to a mask associated with a frame of the one or more frames based on pose information associated with the frame. The process 1200 can include determining whether each vertex of the 3D model of the first portion is located within a first region of the mask associated with the frame. As noted above, the first region of the mask may correspond to a facial region of a person. In some examples, the 3D base model may be generated by combining the mask with a rasterization of the 3D model of the first portion. In some cases, the process 1200 can include extracting the 3D base model based on vertices of the 3D model of the first portion being within the first region of the mask associated with the frame, as described with respect to at least FIG. 10.

At block 1208, the process 1200 includes generating, based on the mask and the 3D base model, a 3D model of the second portion of the object. For example, the model extractor 225 illustrated in FIG. 2 may generate, based on the mask and the 3D base model, a 3D model of the second portion of the object, such as using the techniques described with respect to FIG. 10. The 3D model of the second portion of the object is generated so that it is aligned with (e.g., abut) the 3D model of the first portion of the object. As noted above, the 3D model of the second portion of the object does not visibly collide with the 3D model of the first portion of the object. For instance, as described with respect to FIG. 8A, because the mask is generated based on a combination of object parsing masks (e.g., from the key frames) and a rasterization of the 3D model of the first portion, alignment of the 3D model of the second portion can be ensured with respect to the 3D model of the first portion.

In some examples, the 3D model of the second portion corresponds to an item that is part of the object. In one illustrative example, the object is a person, the first portion of the object corresponds to a head of the person, and the second portion of the object corresponds to hair on the head of the person (e.g., as described above with respect to FIG. 8A-FIG. 10). In some examples, the 3D model of the second portion corresponds to an item that is separable from the object and/or that is movable relative to the object. In one illustrative example, the object is a person, the first portion of the 3D model corresponds to a body region of the person, and the second portion of the 3D model corresponds to an accessory or clothing worn by the person.

In some examples, to generate the 3D model of the second portion of the object, the process 1200 can include initializing a value of each vertex of the 3D base model to an initial value. Each vertex of the 3D base model may be projected into a key frame of the one or more frames. The process 1200 may include determining whether the vertex of the 3D base model is projected into the first mask or the second mask of the first key frame. In some cases, the process 1200 can include adjusting the value of each vertex based on whether the corresponding vertex is projected into the first mask or the second mask. For instance, the value of the first vertex may be increased when the first vertex is projected onto the second region and the value of the first vertex may be decreased when the first vertex is projected onto the first region.

In some aspects, the process 1200 can include determining a mean probability based on the value of each vertex. The process 1200 can further determine a probability that a vertex corresponds to the 3D model of the first or second portion of the object. In some examples, the process 1200 can determine the probability that the vertex corresponds to the 3D model of the first portion or the second of the object at least in part by comparing the value of the vertex to the mean probability. Based on the probability that each vertex of the one or more vertices correspond to the first portion or the second portion of the object (e.g., based on whether the one or more vertices are within a region of the one or more regions of a frame from the one or more frames), vertices are removed from the 3D base model. For example, the process 1200 can include removing vertices based on whether a corresponding vertex is identified as corresponding to the second region (e.g., a hair region) or the first region (e.g., a face region). In one example, vertices that correspond to the first region (e.g., the face region) can be removed from the 3D base model, while vertices that correspond to the second region (e.g., the hair region) can be retained and used for the 3D model of the second portion of the object (e.g., for the 3D model of the hair).

In some examples, the process 1200 can include generating an animation in an application using the 3D model of the first portion and the 3D model of the second portion. The application may include functions to transmit and receive at least one of audio and text, and may display the 3D model of the first portion and the 3D model of the second portion. For example, when the 3D model of the first portion and the 3D model of the second portion are concurrently displayed, the application may depicts a user of the application.

In some aspects, the process 1200 includes receiving input corresponding to selection of at least one graphical control for modifying the 3D model of the second portion. The process 1200 can include modifying the 3D model of the second portion based on the received input. In one example, the user of the application may modify the 3D model of the second portion to, for example, increase or decrease a length of the hair.

Figure 13:
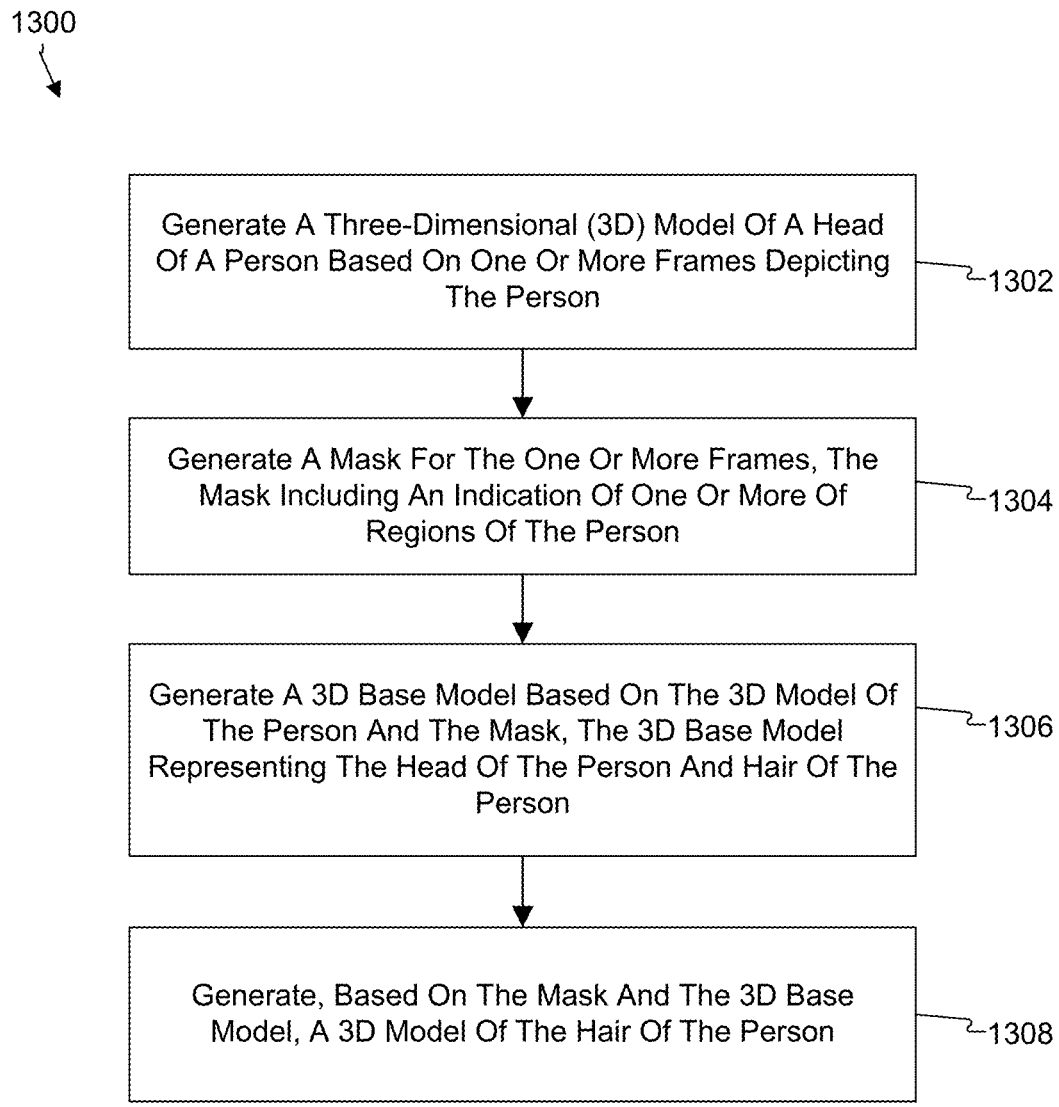
FIG. 13 is a flowchart illustrating another example of a process for generating one or more models, in accordance with some examples.

FIG. 13 illustrates another example of a process 1300 for generating one or more models. At block 1302, the process 1300 includes generating a three-dimensional (3D) model of a head of a person based on one or more frames depicting the person. In some cases, similar to that described with respect to the process 1200, the process 1300 can include selecting the one or more frames as key frames from a sequence of frames. For instance, the process 1300 can include determining that a first key frame does not meet a quality threshold. When the first key frame does not meet the quality threshold, the process 1300 can include functions related to capturing additional images. In one illustrative example, the process 1300 can include outputting feedback to facilitate positioning of the person to correspond to the first key frame, capturing at least one frame based on the feedback, and inserting a frame from the at least one frame into the key frames.

At block 1304, the process 1300 includes generating a mask for the one or more frames, the mask including an indication of one or more of regions of the person. For instance, the process 1300 can include segmenting each frame of the one or more frames into one or more regions and generating one or more masks for each frame. The one or masks include an indication of the one or more regions. In some examples, a first mask can include an indication of a first region (e.g., a face region of the person) and a second can include an indication of a second region (e.g., a hair region of the person).

At block 1306, the process 1300 includes generating a 3D base model based on the 3D model of the first portion of the person and the mask. The 3D base model may correspond to an outer boundary of the head of the person and hair of the person. To generate the 3D base model, the process 1300 can include projecting each vertex of an initial 3D model to a mask associated with a frame of the one or more frames based on pose information associated with the frame, determining whether each vertex of the 3D model of the head is located within a head region of the mask associated with the frame, and extracting the 3D base model based on vertices of the 3D model of the head being within the head region of the mask associated with the frame. In some examples, one or more vertices from the 3D base model can be removed based on a probability that each vertex of the one or more vertices is outside of the head region.

At block 1308, the process 1300 includes generating, based on the mask and the 3D base model, a 3D model of the hair of the person. In one illustrative example, the 3D model of the hair of the person does not visibly collide with the 3D model of the head of the person. To generate the 3D model of the hair of the person, the process 1300 can include initializing a value of each vertex of the 3D base model to an initial value, projecting a first vertex of the 3D base model into a key frame of the one or more frames, and determining whether the vertex of the 3D base model is projected into a first mask or a second mask of a first key frame. In one illustrative example, the first mask may correspond to a face region and the second mask may correspond to the hair region, as noted above.

In some examples, generating the 3D model of the hair of the person may include adjusting the value of each vertex based on whether the corresponding vertex is projected into the first mask or the second mask. For instance, the value of the first vertex may be increased when the first vertex is projected onto the second mask (corresponding to the hair region) and the value of the first vertex may be decreased when the first vertex is projected onto the first mask (corresponding to the face region).

In some cases, the process 1300 can include determining a mean probability based on the value of each vertex. A probability that a vertex corresponds to the 3D model of the hair is based on a comparison of the value of the vertex to the mean probability. For instance, when the probability indicates that the vertex does not correspond to 3D model of the hair, the vertex is removed because the vertex likely corresponds to the 3D model of the head. When the vertex corresponds to the 3D model of the hair, the vertex is preserved for the 3D model of the hair.

In some examples, the 3D models of objects can be included in various applications that are executed by a device. A device may execute an application that displays a 3D model (e.g., an avatar) corresponding to a user of the application. The application may include functions to transmit communication (e.g., voice, text, etc.) that are input by the person. In one illustrative example, the application may be a text messaging application that displays the user corresponding to the avatar and the user may include additional context by providing input to animate the user's avatar. The user may provide an input to cause the user's avatar to animate the first portion of the 3D model and/or otherwise move, such as to provide non-verbal cues and context (e.g., a smile, a laugh, a head shake, a head nod, etc.). In one illustrative example, the 3D hair model may be positioned with and move with the head model without creating any visible collisions.

The application may also include a user interface to modify the 3D model of the second portion (e.g., a hair 3D model). The application may display at least one graphical control to modify the 3D model of the second portion, receive a signal indicating the at least one graphical control has been selected by the user, and visually modify the 3D model of the second portion based on the at least one graphical control. The graphical control may be any suitable function such as resizing or shaping of the 3D hair model. However, the graphical control could also control specific functions related to the second portion of the 3D model. As an example, the graphical control could increase a volume or change a length of hair (e.g., shorten or lengthen) of the 3D hair model.

In other examples, a device may include an application or function to capture the sequence of frames and perform some of the processes described herein (e.g., process 500, process 700, process 900, process 1200, process 1300, and/or other process described herein). The application or function may be able to ascertain that a particular key frame does not meet a quality threshold (e.g., a correlation or a similarity of a key frame is less than a minimum threshold). In such a case, the application or function my output a user interface element (e.g., a notification, message, etc.) or otherwise provide feedback (e.g., visual, audible, haptic, and/or other feedback) to facilitate positioning of the object to correspond to the particular key frame. For instance, the application may audibly, visually, or physically (e.g., via haptic feedback) provide feedback information to the person executing the application or function to help align the object. The application can cause a camera to capture at least one image or frame while providing the feedback information. If the application determines a particular frame in the at least one frame satisfies the quality threshold or is an improvement over the original key frame, the application may remove the original key frame and insert the particular frame into the collection of key frames.

In some examples, the processes described herein (e.g., process 500, process 700, process 900, process 1200, process 1300, and/or other process described herein) may be performed by a computing device or apparatus. In some examples, the processes 500, 700, 900, 1100, or 1200 can be performed by the system 200. In another example, the processes 500, 700, 900, 1200, or 1300 can be performed by a computing device or system with the architecture of the computing system 1400 shown in FIG. 14.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the processes 500, 700, 900, 1200, or 1300. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 700, 900, 1200, and 1300 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500, 700, 900, 1200, or 1300 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
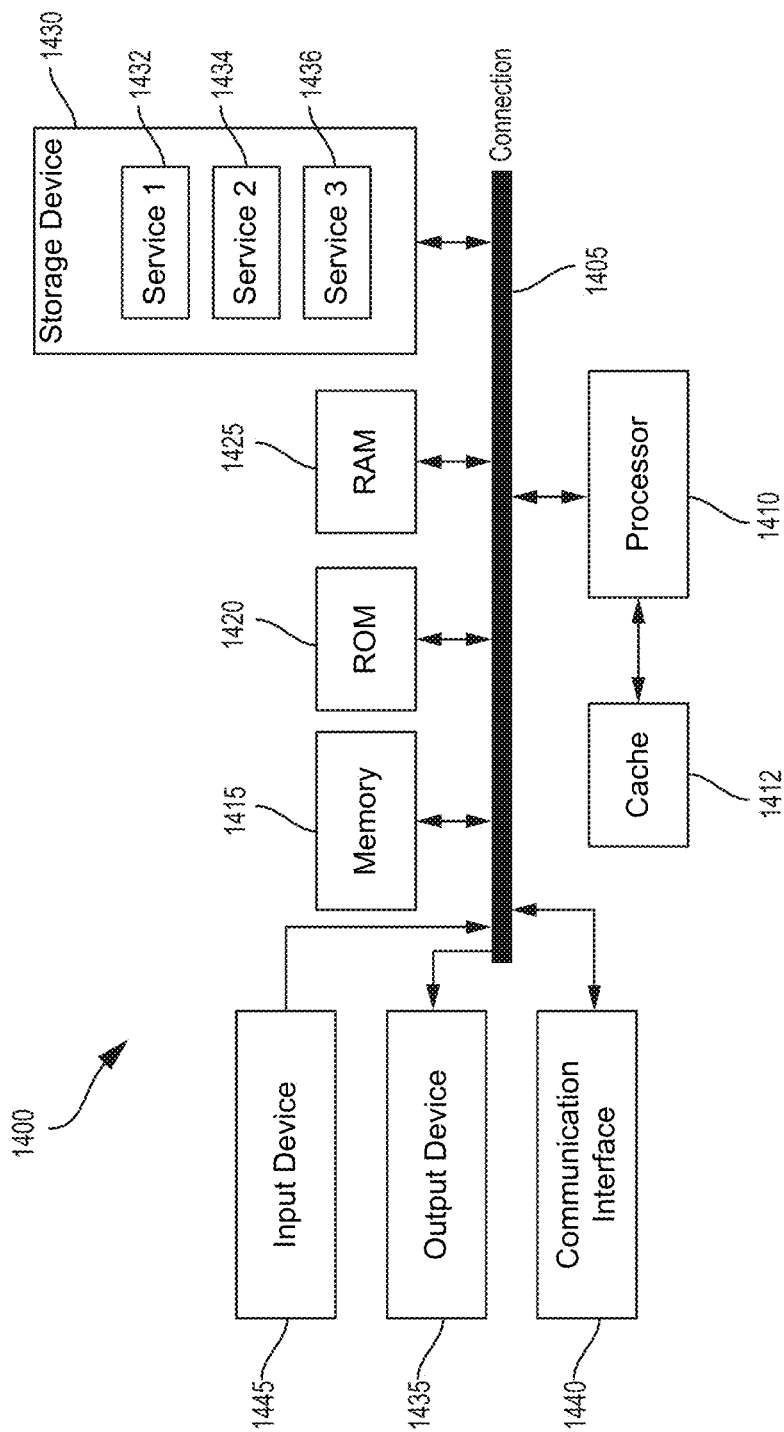
FIG. 14 is a diagram illustrating an example of a system for implementing certain aspects of the present technology.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for generating one or more models, comprising a memory and one or more processors (e.g., implemented in circuitry) coupled to the memory. The memory can be configured to store data, such as one or more frames, one or more three-dimensional models, and/or other data. The one or more processors are configured to: generate a three-dimensional (3D) model of a first portion of an object based on one or more frames depicting the object; generate a mask for the one or more frames, the mask including an indication of one or more of regions of the object; generate a 3D base model based on the 3D model of the first portion of the object and the mask, the 3D base model representing the first portion of the object and a second portion of the object; and generate, based on the mask and the 3D base model, a 3D model of the second portion of the object.

Aspect 2: The apparatus of Aspect 1, wherein the 3D model of the second portion corresponds to an item that is part of the object.

Aspect 3: The apparatus of any of Aspects 1 or 2, wherein the object is a person, the first portion of the object corresponds to a head of the person, and the second portion of the object corresponds to hair on the head of the person.

Aspect 4: The apparatus of Aspect 1, wherein the 3D model of the second portion corresponds to an item that is at least one of separable from the object and movable relative to the object.

Aspect 5: The apparatus of any of Aspects 1 or 4, wherein the object is a person, the first portion of the 3D model corresponds to a body region of the person, and the second portion of the 3D model corresponds to an accessory or clothing worn by the person.

Aspect 6: The apparatus of any of Aspects 1 to 5, wherein the 3D model of the second portion of the object abuts at least a portion of the 3D model of the first portion of the object.

Aspect 7: The apparatus of any of Aspects 1 to 6, wherein the 3D model of the second portion of the object does not visibly collide with the 3D model of the first portion of the object.

Aspect 8: The apparatus of any of Aspects 1 to 7, wherein the one or more processors are configured to: select the one or more frames as key frames from a sequence of frames, wherein each key frame depicts the object at different angles.

Aspect 9: The apparatus of any of Aspects 1 to 8, wherein the one or more processors are configured to: determine that a first key frame does not meet a quality threshold; output feedback to facilitate positioning of the object to correspond to the first key frame; capture at least one frame based on the feedback; and insert a frame from the at least one frame into the key frames.

Aspect 10: The apparatus of any of Aspects 1 to 9, wherein the one or more processors are configured to: generate a first bitmap from the 3D model of the first portion of the object for a first angle selected along an axis; generate a first metric at least in part by comparing the first bitmap to a reference frame of the sequence of frames; and select a first key frame based on a result of the comparison.

Aspect 11: The apparatus of Aspect 10, wherein, to compare the first bitmap to the reference frame, the one or more processors are configured to perform an intersection over union of the first bitmap and a bitmap of the reference frame.

Aspect 12: The apparatus of any of Aspects 10 or 11, wherein the one or more processors are configured to: generate a second metric at least in part by comparing the reference frame to a bitmap of a second frame of the sequence of frames; and select the second frame as the first key frame based on the second metric.

Aspect 13: The apparatus of any of Aspects 1 to 12, wherein the one or more processors are configured to: segment each frame of the one or more frames into one or more regions; and generate a mask for each frame of the one or more frames, wherein the mask for each frame includes an indication of the one or more regions.

Aspect 14: The apparatus of any of Aspects 1 to 13, wherein the one or more processors are configured to: determine a union between a rasterization of the 3D model of the first portion of the object for a frame, a first mask for a first region of the object, and a second mask for a second region of the object; and generate a mask for the frame based on the determined union.

Aspect 15: The apparatus of any of Aspects 1 to 14, wherein a mask for each frame of the one or more frames comprises a first mask that identifies the first region of the object and a second mask that identifies the second region of the object.

Aspect 16: The apparatus of any of Aspects 1 to 15, wherein the one or more processors are configured to: initialize a value of each vertex of the 3D base model to an initial value, wherein the initial value indicates that a corresponding vertex is disposed within the first region; project a first vertex of the 3D base model into a key frame of the one or more frames; determine whether the vertex of the 3D base model is projected into a first mask or a second mask of a first key frame; and adjust the value of each vertex based on whether the corresponding vertex is projected into the first mask or the second mask.

Aspect 17: The apparatus of any of Aspects 14 to 16, wherein the first region is a face region and the second region is a hair region.

Aspect 18: The apparatus of any of Aspects 16 or 17, wherein the value of the first vertex is increased when the first vertex is projected onto the second region, and the value of the first vertex is increased when the first vertex is projected onto the second region, and.

Aspect 19: The apparatus of any of Aspects 16 to 18, wherein the one or more processors are configured to: determine a mean probability based on the value of each vertex, wherein a probability that a vertex corresponds to the 3D model of the first portion of the object is based on a comparison of the value of the vertex to the mean probability.

Aspect 20: The apparatus of any of Aspects 1 to 19, wherein the one or more processors are configured to: project each vertex of an initial 3D model to a mask associated with a frame of the one or more frames based on pose information associated with the frame; determine whether each vertex of the 3D model of the first portion is located within a first region of the mask associated with the frame; and extract the 3D base model based on vertices of the 3D model of the first portion being within the first region of the mask associated with the frame.

Aspect 21: The apparatus of Aspect 20, wherein the object is a person and the first region corresponds to a facial region of the person and a hair region of the person.

Aspect 22: The apparatus of Aspect 20, wherein the object is a person and the first region corresponds to a body region of the person and a dress region worn by the person.

Aspect 23: The apparatus of any of Aspects 20 to 22, wherein the one or more processors are configured to: remove one or more vertices from the 3D base model based on a probability that each vertex of the one or more vertices is within a region of the one or more regions of a frame from the one or more frames.

Aspect 24: The apparatus of any of Aspects 1 to 23, wherein the one or more processors are configured to: generate an animation in an application using the 3D model of the first portion and the 3D model of the second portion, wherein the object comprises a person, the 3D model of the first portion corresponds to a head of the person, and the 3D model of the second portion corresponds to hair of the person.

Aspect 25: The apparatus of any of Aspects 1 to 24, wherein the application includes functions to transmit and receive at least one of audio and text.

Aspect 26: The apparatus of any of Aspects 1 to 25, wherein the 3D model of the first portion and the 3D model of the second portion depict a user of the application.

Aspect 27: The apparatus of any of Aspects 1 to 26, wherein the one or more processors are configured to: receive input corresponding to selection of at least one graphical control for modify the 3D model of the second portion; and modify the 3D model of the second portion based on the received input.

Aspect 28: The apparatus of any of Aspects 1 to 27, wherein the one or more frames are associated with a rotation of the object along a first axis.

Aspect 29: The apparatus of Aspect 28, wherein the one or more frames are associated with a rotation of the object along a second axis.

Aspect 30: The apparatus of Aspect 29, wherein the first axis corresponds to a yaw axis and the second axis corresponds to a pitch axis.

Aspect 31: A method for generating one or more models. The method comprises: generating a three-dimensional (3D) model of a first portion of an object based on one or more frames depicting the object; generating a mask for the one or more frames, the mask including an indication of one or more regions of the object; generating a 3D base model based on the 3D model of the first portion of the object and the mask, the 3D base model representing the first portion of the object and a second portion of the object; and generating, based on the mask and the 3D base model, a 3D model of the second portion of the object.

Aspect 32: The method of Aspect 31, wherein the 3D model of the second portion corresponds to an item that is part of the object.

Aspect 33: The method of any of Aspects 31 or 32, wherein the object is a person, the first portion of the object corresponds to a head of the person, and the second portion of the object corresponds to hair on the head of the person.

Aspect 34: The method of Aspect 31, wherein the 3D model of the second portion corresponds to an item that is at least one of separable from the object and movable relative to the object.

Aspect 35: The method of any of Aspects 31 or 34, wherein the object is a person, the first portion of the 3D model corresponds to a body region of the person, and the second portion of the 3D model corresponds to an accessory or clothing worn by the person.

Aspect 36: The method of any of Aspects 31 to 35, wherein the 3D model of the second portion of the object abuts at least a portion of the 3D model of the first portion of the object.

Aspect 37: The method of any of Aspects 31 to 36, wherein the 3D model of the second portion of the object does not visibly collide with the 3D model of the first portion of the object.

Aspect 38: The method of any of Aspects 31 to 37, further comprising: selecting the one or more frames as key frames from a sequence of frames, wherein each key frame depicts the object at different angles.

Aspect 39: The method of any of Aspects 31 to 38, further comprising: determining that a first key frame does not meet a quality threshold; outputting feedback to facilitate positioning of the object to correspond to the first key frame; capturing at least one frame based on the feedback; and inserting a frame from the at least one frame into the key frames.

Aspect 40: The method of any of Aspects 31 to 39, further comprising: generating a first bitmap from the 3D model of the first portion of the object for a first angle selected along an axis; generating a first metric at least in part by comparing the first bitmap to a reference frame of the sequence of frames; and selecting a first key frame based on a result of the comparison.

Aspect 41: The method of Aspect 40, wherein comparing the first bitmap to the reference frame comprises performing an intersection over union of the first bitmap and a bitmap of the reference frame.

Aspect 42: The method of any of Aspects 40 or 41, further comprising: generating a second metric at least in part by comparing the reference frame to a bitmap of a second frame of the sequence of frames; and selecting the second frame as the first key frame based on the second metric.

Aspect 43: The method of any of Aspects 31 to 42, further comprising: segmenting each frame of the one or more frames into one or more regions; and generating a mask for each frame of the one or more frames, wherein the mask for each frame includes an indication of the one or more regions.

Aspect 44: The apparatus of any of Aspects 31 to 43, wherein the one or more processors are configured to: determine a union between a rasterization of the 3D model of the first portion of the object for a frame, a first mask for a first region of the object, and a second mask for a second region of the object; and generate a mask for the frame based on the determined union.

Aspect 45: The method of any of Aspects 31 to 42, wherein a mask for each frame of the one or more frames comprises a first mask that identifies the first region of the object and a second mask that identifies the second region of the object.

Aspect 46: The method of any of Aspects 31 to 43, further comprising: initializing a value of each vertex of the 3D base model to an initial value, wherein the initial value indicates that a corresponding vertex is disposed within the first region; projecting a first vertex of the 3D base model into a key frame of the one or more frames; determining whether the vertex of the 3D base model is projected into a first mask or a second mask of a first key frame; and adjusting the value of each vertex based on whether the corresponding vertex is projected into the first mask or the second mask.

Aspect 47: The method of any of Aspects 44 to 46, wherein the first region is a face region and the second region is a hair region.

Aspect 48: The method of any of Aspects 46 or 47, wherein the value of the first vertex is increased when the first vertex is projected onto the second region, and the value of the first vertex is increased when the first vertex is projected onto the second region, and.

Aspect 49: The method of any of Aspects 15 to 48, further comprising: determining a mean probability based on the value of each vertex, wherein a probability that a vertex corresponds to the 3D model of the first portion of the object is based on a comparison of the value of the vertex to the mean probability.

Aspect 50: The method of any of Aspects 31 to 49, further comprising: projecting each vertex of an initial 3D model to a mask associated with a frame of the one or more frames based on pose information associated with the frame; determining whether each vertex of the 3D model of the first portion is located within a first region of the mask associated with the frame; and extracting the 3D base model based on vertices of the 3D model of the first portion being within the first region of the mask associated with the frame.

Aspect 51: The method of Aspect 50, wherein the object is a person and the first region corresponds to a facial region of the person and a hair region of the person.

Aspect 52: The method of Aspect 50, wherein the object is a person and the first region corresponds to a body region of the person and a dress region worn by the person.

Aspect 53: The method of any of Aspects 50 to 52, further comprising: removing one or more vertices from the 3D base model based on a probability that each vertex of the one or more vertices is within a region of the one or more regions of a frame from the one or more frames.

Aspect 54: The method of any of Aspects 31 to 53, further comprising: generating an animation in an application using the 3D model of the first portion and the 3D model of the second portion, wherein the object comprises a person, the 3D model of the first portion corresponds to a head of the person, and the 3D model of the second portion corresponds to hair of the person.

Aspect 55: The method of any of Aspects 31 to 54, wherein the application includes functions to transmit and receive at least one of audio and text.

Aspect 56: The method of any of Aspects 31 to 55, wherein the 3D model of the first portion and the 3D model of the second portion depict a user of the application.

Aspect 57: The method of any of Aspects 31 to 56, further comprising: receiving input corresponding to selection of at least one graphical control for modify the 3D model of the second portion; and modifying the 3D model of the second portion based on the received input.

Aspect 58: The method of any of Aspects 31 to 57, wherein the one or more frames are associated with a rotation of the object along a first axis.

Aspect 59: The method of Aspect 58, wherein the one or more frames are associated with a rotation of the object along a second axis.

Aspect 60: The method of Aspect 59, wherein the first axis corresponds to a yaw axis and the second axis corresponds to a pitch axis.

Aspect 61: A computer-readable storage medium storing instructions that, when executed, cause one or more processors to perform operations according to any of aspects 1 to 60.

Aspect 62: An apparatus for digital imaging, the apparatus comprising means for performing operations according to any of aspects 1 to 60.

Aspect 63: An apparatus for generating one or more models, comprising a memory and one or more processors (e.g., implemented in circuitry) coupled to the memory. The memory can be configured to store data, such as one or more frames, one or more three-dimensional models, and/or other data. The one or more processors are configured to: generate a three-dimensional (3D) model of a head of a person based on one or more frames depicting the person; generate a mask for the one or more frames, the mask including an indication of one or more of regions of the person; generate a 3D base model based on the 3D model of the first portion of the person and the mask, the 3D base model representing the head of the person and hair of the person; and generate, based on the mask and the 3D base model, a 3D model of the hair of the person.

Aspect 64: The apparatus of Aspect 63, further comprising: selecting the one or more frames as key frames from a sequence of frames, wherein each key frame depicts the person at different angles.

Aspect 65: The apparatus of any of Aspects 63 to 64, further comprising: determining that a first key frame does not meet a quality threshold; output feedback to facilitate positioning of the person to correspond to the first key frame; capturing at least one frame based on the feedback; and insert a frame from the at least one frame into the key frames.

Aspect 66: The apparatus of any of Aspects 63 to 65, wherein generating the mask for the one or more frames comprises: segmenting each frame of the one or more frames into one or more regions; and generating a mask for each frame of the one or more frames, wherein the mask for each frame includes an indication of the one or more regions.

Aspect 67: The apparatus of any of Aspects 63 to 66, wherein generating the 3D base model comprises: projecting each vertex of an initial 3D model to a mask associated with a frame of the one or more frames based on pose information associated with the frame; determining whether each vertex of the 3D model of the head is located within a head region of the mask associated with the frame; and extracting the 3D base model based on vertices of the 3D model of the head being within the head region of the mask associated with the frame.

Aspect 68: The apparatus of any of Aspects 63 to 67, further comprising: removing one or more vertices from the 3D base model based on a probability that each vertex of the one or more vertices is outside of the head region.

Aspect 69: The apparatus of any of Aspects 63 to 68, wherein the 3D model of the second portion of the object abuts at least a portion of the 3D model of the first portion of the object.

Aspect 70: The apparatus of any of Aspects 63 to 69, wherein the 3D model of the hair of the person does not visibly collide with the 3D model of the head of the person.

Aspect 71: The apparatus of any of Aspects 63 to 70, wherein generating the 3D model of the hair of the person comprises: initializing a value of each vertex of the 3D base model to an initial value, wherein the initial value indicates that a corresponding vertex is disposed within a hair region; projecting a first vertex of the 3D base model into a key frame of the one or more frames; determining whether the vertex of the 3D base model is projected into a first mask or a second mask of a first key frame, wherein the first mask corresponds to a face region and the second mask corresponds to the hair region; and adjusting the value of each vertex based on whether the corresponding vertex is projected into the first mask or the second mask.

Aspect 72: The apparatus of Aspect 71, wherein the value of the first vertex is increased when the first vertex is projected onto the second mask (corresponding to the hair region), and wherein the value of the first vertex is decreased when the first vertex is projected onto the first mask (corresponding to the face region).

Aspect 73: The apparatus of any of Aspects 63 to 72, further comprising: determining a mean probability based on the value of each vertex, wherein a probability that a vertex corresponds to the 3D model of the hair is based on a comparison of the value of the vertex to the mean probability.

Aspect 74: A method of generating one or more models, comprising: generating a three-dimensional (3D) model of a head of a person based on one or more frames depicting the person; generating a mask for the one or more frames, the mask including an indication of one or more of regions of the person; generating a 3D base model based on the 3D model of the first portion of the person and the mask, the 3D base model representing the head of the person and hair of the person; and generating, based on the mask and the 3D base model, a 3D model of the hair of the person.

Aspect 75: The method of Aspect 74, further comprising: selecting the one or more frames as key frames from a sequence of frames, wherein each key frame depicts the person at different angles.

Aspect 76: The method of any of Aspects 74 to 75, further comprising: determining that a first key frame does not meet a quality threshold; output feedback to facilitate positioning of the person to correspond to the first key frame; capturing at least one frame based on the feedback; and insert a frame from the at least one frame into the key frames.

Aspect 77: The method of any of Aspects 74 to 76, wherein generating the mask for the one or more frames comprises: segmenting each frame of the one or more frames into one or more regions; and generating a mask for each frame of the one or more frames, wherein the mask for each frame includes an indication of the one or more regions.

Aspect 78: The method of any of Aspects 74 to 77, wherein generating the 3D base model comprises: projecting each vertex of an initial 3D model to a mask associated with a frame of the one or more frames based on pose information associated with the frame; determining whether each vertex of the 3D model of the head is located within a head region of the mask associated with the frame; and extracting the 3D base model based on vertices of the 3D model of the head being within the head region of the mask associated with the frame.

Aspect 79: The method of any of Aspects 74 to 78, further comprising: removing one or more vertices from the 3D base model based on a probability that each vertex of the one or more vertices is outside of the head region.

Aspect 80: The method of any of Aspects 74 to 79, wherein the 3D model of the second portion of the object abuts at least a portion of the 3D model of the first portion of the object.

Aspect 81: The method of any of Aspects 74 to 80, wherein the 3D model of the hair of the person does not visibly collide with the 3D model of the head of the person.

Aspect 82: The method of any of Aspects 74 to 81, wherein generating the 3D model of the hair of the person comprises: initializing a value of each vertex of the 3D base model to an initial value, wherein the initial value indicates that a corresponding vertex is disposed within a hair region; projecting a first vertex of the 3D base model into a key frame of the one or more frames; determining whether the vertex of the 3D base model is projected into a first mask or a second mask of a first key frame, wherein the first mask corresponds to a face region and the second mask corresponds to the hair region; and adjusting the value of each vertex based on whether the corresponding vertex is projected into the first mask or the second mask.

Aspect 83: The method of Aspect 82, wherein the value of the first vertex is increased when the first vertex is projected onto the second mask (corresponding to the hair region), and wherein the value of the first vertex is decreased when the first vertex is projected onto the first mask (corresponding to the face region).

Aspect 84: The method of any of Aspects 74 to 83, further comprising: determining a mean probability based on the value of each vertex, wherein a probability that a vertex corresponds to the 3D model of the hair is based on a comparison of the value of the vertex to the mean probability.

Aspect 85: A computer-readable medium comprising at least one instruction for causing a computer or processor to perform operations according to any of aspects 63 to 84.

Aspect 86: An apparatus for generating one or more models, the apparatus including means for performing operations according to any of aspects 63 to 84.

Aspect 87: An apparatus for generating one or more models. The apparatus includes at least one memory and at least one processor coupled to the at least one memory. The at least one processor is configured to perform operations according to any of aspects 1 to 60 and any of aspects 63 to 84.

Aspect 88: A method of generating one or more models, the method including operations according to any of aspects 1 to 60 and any of aspects 63 to 84.

Aspect 89: A computer-readable medium comprising at least one instruction for causing a computer or processor to perform operations according to any of aspects 1 to 60 and any of aspects 63 to 84.

Aspect 90: An apparatus for generating one or more models, the apparatus including means for performing operations according to any of aspects 1 to 60 and any of aspects 63 to 84.

What is claimed is:

1. An apparatus for generating one or more models, comprising:
   a memory; and
   one or more processors coupled to the memory, the one or more processors configured to:
   generate a three-dimensional (3D) model of a first portion of an object based on one or more frames depicting the object;
   generate at least one mask for the one or more frames, the at least one mask including an indication of one or more of regions of the object;
   generate a 3D base model based on a union between a representation of the 3D model of the first portion of the object and the at least one mask, the 3D base model representing the first portion of the object and a second portion of the object; and
   generate, based on the at least one mask and the 3D base model, a 3D model of the second portion of the object.

2. The apparatus of claim 1, wherein the 3D model of the second portion corresponds to an item that is part of the object.

3. The apparatus of claim 1, wherein the object is a person, the first portion of the object corresponds to a head of the person, and the second portion of the object corresponds to hair on the head of the person.

4. The apparatus of claim 1, wherein the 3D model of the second portion corresponds to an item that is at least one of separable from the object and movable relative to the object.

5. The apparatus of claim 1, wherein the object is a person, the first portion of the object corresponds to a body region of the person, and the second portion of the object corresponds to an accessory or clothing worn by the person.

6. The apparatus of claim 1, wherein the 3D model of the second portion of the object abuts at least a portion of the 3D model of the first portion of the object.

7. The apparatus of claim 1, wherein the one or more processors are configured to:
   segment each frame of the one or more frames into one or more regions; and
   generate a mask for each frame of the one or more frames, wherein the mask for each frame includes an indication of the one or more regions.

8. The apparatus of claim 1, wherein the representation of the 3D model of the first portion of the object is a rasterization of the 3D model of the first portion of the object for a frame, wherein the at least one mask includes a first mask for a first region of the object and a second mask for a second region of the object, and wherein the one or more processors are configured to:
   determine the union between the rasterization of the 3D model of the first portion of the object for the frame, the first mask for the first region of the object, and the second mask for the second region of the object.

9. The apparatus of claim 8, wherein the first region is a face region of the object and the second region is a hair region of the object.

10. The apparatus of claim 1, wherein the one or more processors are configured to:
    project each vertex of an initial 3D model to a mask associated with a frame of the one or more frames based on pose information associated with the frame;
    determine whether each vertex of the 3D model of the first portion is located within a first region of the mask associated with the frame; and
    extract the 3D base model based on vertices of the 3D model of the first portion being within the first region of the mask associated with the frame.

11. The apparatus of claim 10, wherein the object is a person and the first region corresponds to a facial region of the person and a hair region of the person.

12. The apparatus of claim 10, wherein the object is a person and the first region corresponds to a body region of the person and a dress region worn by the person.

13. The apparatus of claim 10, wherein the one or more processors are configured to:
    remove one or more vertices from the 3D base model based on a probability that each vertex of the one or more vertices is within a region of the one or more regions of a frame from the one or more frames.

14. The apparatus of claim 1, wherein the one or more processors are configured to:

generate an animation in an application using the 3D model of the first portion and the 3D model of the second portion, wherein the object comprises a person, the 3D model of the first portion corresponds to a head of the person, and the 3D model of the second portion corresponds to hair of the person.

15. The apparatus of claim 14, wherein the application includes functions to transmit and receive at least one of audio and text.

16. The apparatus of claim 14, wherein the 3D model of the first portion and the 3D model of the second portion depict a user of the application.

17. The apparatus of claim 1, wherein the one or more processors are configured to:
   receive input corresponding to selection of at least one graphical control for modifying the 3D model of the second portion; and
   modify the 3D model of the second portion based on the received input.

18. A method of generating one or more models, comprising:
   generating a three-dimensional (3D) model of a first portion of an object based on one or more frames depicting the object;
   generating at least one mask for the one or more frames, the at least one mask including an indication of one or more regions of the object;
   generating a 3D base model based on a union between a representation of the 3D model of the first portion of the object and the at least one mask, the 3D base model representing the first portion of the object and a second portion of the object; and
   generating, based on the at least one mask and the 3D base model, a 3D model of the second portion of the object.

19. The method of claim 18, wherein the 3D model of the second portion corresponds to an item that is part of the object.

20. The method of claim 18, wherein the object is a person, the first portion of the object corresponds to a head of the person, and the second portion of the object corresponds to hair on the head of the person.

21. The method of claim 18, wherein the 3D model of the second portion corresponds to an item that is at least one of separable from the object and movable relative to the object.

22. The method of claim 18, wherein the object is a person, the first portion of the object corresponds to a body region of the person, and the second portion of the object corresponds to an accessory or clothing worn by the person.

23. The method of claim 18, wherein the 3D model of the second portion of the object abuts at least a portion of the 3D model of the first portion of the object.

24. The method of claim 18, wherein generating the at least one mask for the one or more frames comprises:
   segmenting each frame of the one or more frames into one or more regions; and
   generating a mask for each frame of the one or more frames, wherein the mask for each frame includes an indication of the one or more regions.

25. The method of claim 18, wherein the representation of the 3D model of the first portion of the object is a rasterization of the 3D model of the first portion of the object for a frame, wherein the at least one mask includes a first mask for a first region of the object and a second mask for a second region of the object, the method further comprising:
   determining the union between the rasterization of the 3D model of the first portion of the object for the frame, the first mask for the first region of the object, and the second mask for the second region of the object.

26. The method of claim 18, wherein generating the 3D base model comprises:
   projecting each vertex of an initial 3D model to a mask associated with a frame of the one or more frames based on pose information associated with the frame;
   determining whether each vertex of the 3D model of the first portion is located within a first region of the mask associated with the frame; and
   extracting the 3D base model based on vertices of the 3D model of the first portion being within the first region of the mask associated with the frame.

27. The method of claim 26, further comprising:
   removing one or more vertices from the 3D base model based on a probability that each vertex of the one or more vertices is within a region of the one or more regions of a frame from the one or more frames.

28. The method of claim 18, further comprising:
   generating an animation in an application using the 3D model of the first portion and the 3D model of the second portion, wherein the object comprises a person, the 3D model of the first portion corresponds to a head of the person, and the 3D model of the second portion corresponds to hair of the person.

29. The method of claim 28, wherein the 3D model of the first portion and the 3D model of the second portion depict a user of the application.

30. The method of claim 18, further comprising:
   receiving input corresponding to selection of at least one graphical control for modifying the 3D model of the second portion; and
   modifying the 3D model of the second portion based on the received input.

* * * * *